US010891639B2

(12) United States Patent
Firstbrook et al.

(10) Patent No.: US 10,891,639 B2
(45) Date of Patent: Jan. 12, 2021

(54) PROCESSING QUALITATIVE RESPONSES

(71) Applicant: FULCRUM MANAGEMENT SOLUTIONS LTD., Rossland (CA)

(72) Inventors: James H. Firstbrook, Rossland (CA); David A. Macleod, Rossland (CA)

(*) Notice: Subject to any disclaimer, the term of this patent is extended or adjusted under 35 U.S.C. 154(b) by 496 days.

(21) Appl. No.: 15/066,303

(22) Filed: Mar. 10, 2016

(65) Prior Publication Data

US 2016/0189180 A1 Jun. 30, 2016

Related U.S. Application Data

(63) Continuation of application No. PCT/CA2014/050889, filed on Sep. 17, 2014.

(60) Provisional application No. 61/880,578, filed on Sep. 20, 2013, provisional application No. 61/951,044, filed on Mar. 11, 2014.

(51) Int. Cl.
*G06Q 30/02* (2012.01)
*G06F 16/951* (2019.01)

(52) U.S. Cl.
CPC ....... *G06Q 30/0203* (2013.01); *G06F 16/951* (2019.01); *G06Q 30/0201* (2013.01)

(58) Field of Classification Search
CPC ............ G06Q 30/0203; G06Q 30/0201; G06F 17/30864
See application file for complete search history.

(56) References Cited

U.S. PATENT DOCUMENTS

| 4,603,232 A | 7/1986 | Kurland et al. |
| 4,958,284 A | 9/1990 | Bishop et al. |
| 6,687,560 B2 | 2/2004 | Kiser et al. |
| 7,099,819 B2 | 8/2006 | Sakai et al. |
| 7,676,465 B2 | 3/2010 | Poola |
| 8,516,500 B2 | 8/2013 | Hebeler, Jr. et al. |
| 2007/0067273 A1 | 3/2007 | Wilcock |
| 2012/0022920 A1 | 1/2012 | Balestrieri et al. |
| 2012/0096014 A1 | 4/2012 | Davids |

(Continued)

FOREIGN PATENT DOCUMENTS

WO 2015039240 A1 3/2015

OTHER PUBLICATIONS

International Search Report issued in PCT/CA2014/050889, dated Oct. 21, 2014.

(Continued)

*Primary Examiner* — Sujay Koneru
*Assistant Examiner* — Mohamed N El-Bathy
(74) *Attorney, Agent, or Firm* — Marin Patents LP; Gustavo Marin

(57) ABSTRACT

Participant-provided qualitative or comment-style responses to inquiries may be processed to generate processed responses, which may then be evaluated by participants for ranking. The processed responses may reflect groups of similar qualitative responses to, among other things, simplify and reduce the amount of data that needs to be reviewed by the participants for ranking. On the other hand, the processed responses may have a one-to-one correspondence with the qualitative responses, and the grouping of similar responses may occur after the participant ranking. Grouping after participant ranking may have the benefit of, among other things, simplifying the grouping, as only highest ranked responses may need to be grouped.

37 Claims, 9 Drawing Sheets

(56) References Cited

U.S. PATENT DOCUMENTS

| | | |
|---|---|---|
| 2012/0109714 A1 | 5/2012 | Azar |
| 2013/0124525 A1 | 5/2013 | Anderson et al. |
| 2013/0302775 A1 | 11/2013 | King et al. |
| 2015/0172388 A1* | 6/2015 | Moran ............... H04N 21/4788 715/753 |
| 2017/0024395 A1 | 1/2017 | Michelson et al. |

OTHER PUBLICATIONS

Written opinion issued in PCT/CA2014/050889, dated Oct. 21, 2014.
International Search Report issued in Intl. Appln. No. PCT/CA2016/050870 dated Oct. 7, 2016. Cited in U.S. Publication No. 4.
Written Opinion issued in Intl. Appln. No. PCT/CA2016/050870 dated Oct. 7, 2016. Cited in U.S. Publication No. 4.

* cited by examiner

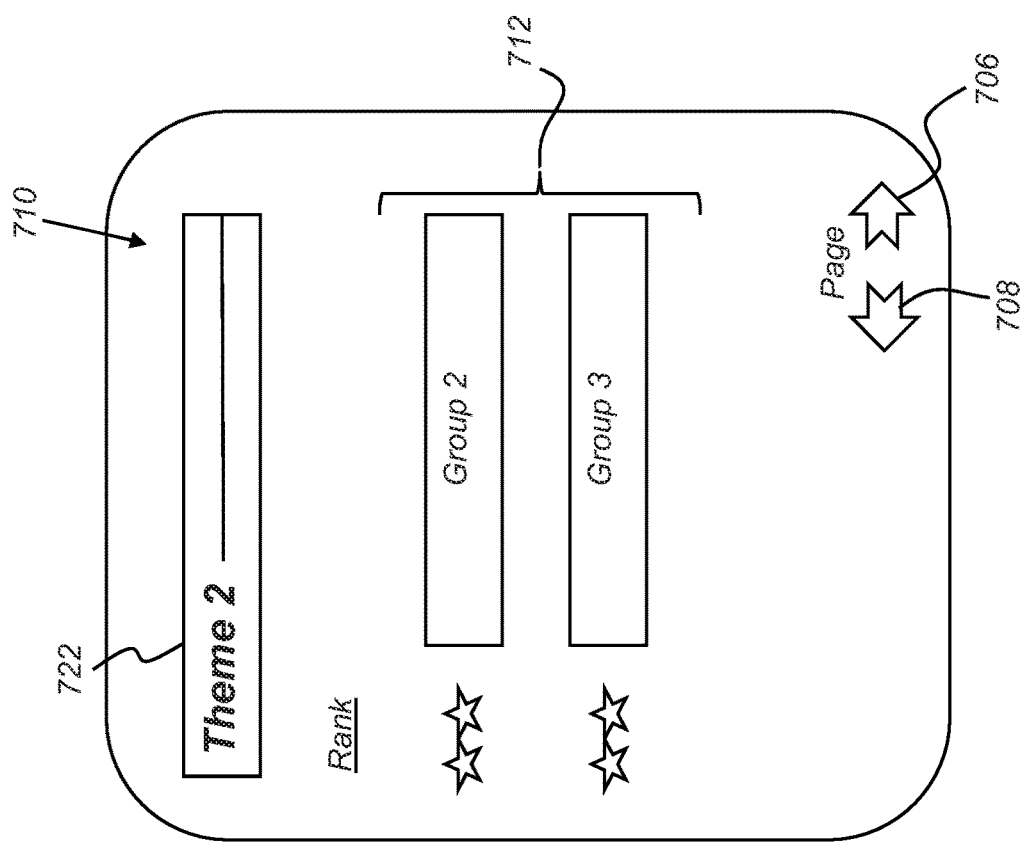
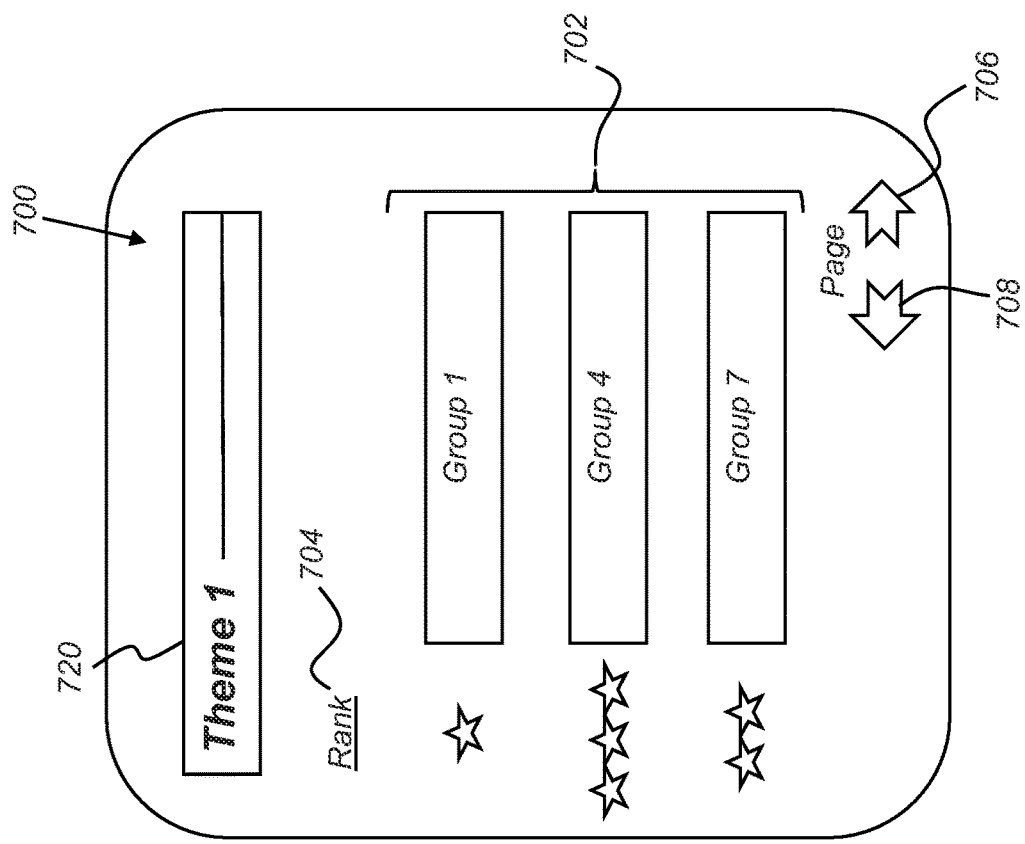
FIG. 7B
FIG. 7A

PROCESSING QUALITATIVE RESPONSES

CROSS-REFERENCE TO RELATED APPLICATIONS

This application is a continuation of International Patent Application No. PCT/CA2014/050889, filed Sep. 17, 2014, which claims priority to each of U.S. Provisional Application No. 61/880,578, filed Sep. 20, 2013, and U.S. Provisional Application No. 61/951,044, filed Mar. 11, 2014, the entire disclosures of all three of these applications are hereby incorporated herein by reference.

TECHNICAL FIELD

Aspects of this disclosure generally are related to systems and methods for processing qualitative, comment-style, responses.

BACKGROUND

Typically, when conducting a 'survey' of participants to gather their input on a topic, two different types of participant responses are elicited: quantitative responses and qualitative responses. A quantitative response is a close-ended response, such as a multiple choice, numeric style, or yes/no response. A qualitative response is an open-ended, comment style response, where the participant has freedom to textualize his or her own personal ideas and is not constrained by pre-determined answers. Accordingly, eliciting qualitative responses may have substantial benefits over quantitative responses in that qualitative responses can provide more precise information about participant thoughts.

However, there are well known limitations with handling, evaluating, or otherwise processing qualitative responses, as compared to quantitative responses. This problem of processing qualitative responses generalizes to dealing with any amount of gathered textual or quantitative information that could be acquired by a survey or by other means (e.g., transcripts of phone conversations).

There is no easy way to aggregate or summarize qualitative textual answers in the way that numeric data can be processed with well known techniques. Conventional techniques for this aggregation are complex and resource-consuming.

Accordingly, a need in the art exists for improved techniques for processing qualitative responses or other information.

SUMMARY

At least the above-discussed needs are addressed and technical solutions are achieved in the art by various embodiments of the present invention. In some embodiments, a method executed by a data processing device system for evaluating inquiry-responses comprises the steps of accessing a plurality of qualitative responses to inquiries from a processor-accessible memory device system; processing the accessed plurality of qualitative responses to generate a plurality of processed responses; and distributing the plurality of processed responses over a network to each of a plurality of participant devices for participant evaluation on a display-screen-page-by-display-screen-page basis with each processed response presented on at least one of multiple display-screen-pages, and with each of the multiple display-screen-pages displaying a different set of the processed responses. Each of the multiple pages may display a user-customizable number of the processed responses for evaluation. The participant evaluation may include at least two of the multiple-display-screen-pages displaying a same one of the processed responses at a same one of the participant devices.

In some embodiments, the distributing step includes distributing a different set of the plurality of processed responses over the network to each of at least some of the plurality of participant devices for the participant evaluation. In some embodiments, the distributing step includes distributing respective subsets of the plurality of processed responses over the network to one or more of the plurality of participant devices for the participant evaluation by respective participants. Each respective subset of the respective subsets of the plurality of processed responses may include at least one processed response of the plurality of processed responses originating from the respective participant. In some embodiments, at least one of the respective subsets of the plurality of processed responses includes all processed responses of the plurality of processed responses originating from the respective participant. In some embodiments, each respective subset of the respective subsets of the plurality of processed responses includes all processed responses of the plurality of processed responses originating from the respective participant. In some embodiments, each respective subset of the respective subsets of the plurality of processed responses includes processed responses of the plurality of processed responses originating from a diverse group of participants. In some embodiments, each respective subset of the respective subsets of the plurality of processed responses includes processed responses of the plurality of processed responses originating from a group of participants that respectively exhibit a similar characteristic with the respective participant.

In some embodiments, the method includes the step of recording, in the processor-accessible memory device system, a number of times each of at least some of the plurality of processed responses has been participant-evaluated. In some embodiments, the method includes the step of recording, in the processor-accessible memory device system, a number of times (a) each of at least some of the plurality of processed responses has been participant-evaluated, or (b) each of at least some of the plurality of processed responses has been included in at least some of the respective subsets. In some embodiments, the method includes the step of generating at least one of the respective subsets to include processed responses of the plurality of processed responses respectively associated with a fewer number of times of the number of times than other processed responses of the plurality of processed responses. In some embodiments, the method includes the step of generating at least some of the respective subsets to include processed responses that cause the numbers of times to become more even.

In some embodiments, the distributing step includes distributing a first set of the plurality of processed responses over the network to at least one of the plurality of participant devices for the participant evaluation on the display-screen-page-by-display-screen-page basis with each of the at least some of the first set of the plurality of processed responses presented on at least one of a plurality of display-screen-pages, and with each of the plurality of display-screen-pages displaying a different subset of the at least some of the first set of the plurality of processed responses. The first set of the plurality of processed responses may be a subset of the plurality of processed responses.

In some embodiments, the processing includes grouping the accessed plurality of qualitative responses to generate each of the plurality of processed responses as a different group. In some embodiments, the processing includes combining at least two duplicate ones of the accessed plurality of qualitative responses into one of the plurality of processed responses as a single group. In some embodiments, the processing does not include grouping the qualitative responses. In some embodiments, each of the processed responses corresponds to a different one of the accessed plurality of qualitative responses.

In some embodiments, the method further includes the steps of receiving participant-evaluated responses in response to the distributing step; and post-processing the received participant-evaluated responses. The post-processing may include grouping at least highest priority ones of the participant-evaluated responses. In some embodiments, the method further includes the step of receiving, after the distributing, participant indications of duplicate processed responses, wherein the post-processing accounts for the participant indications of duplicate processed responses.

In some embodiments, the post-processing includes forming groups of the participant-evaluated responses. In some embodiments, each respective participant-evaluated response of the participant-evaluated responses includes a priority value, the post-processing includes forming at least a first group of the groups based on a first subset of the participant-evaluated responses, the post-processing includes determining at least a group priority value associated with at least the first group based at least on an analysis of the priority values associated with the first subset of the participant-evaluated responses, and the post-processing includes associating, in the processor-accessible memory device system, at least the determined group priority value with at least the first group.

In some embodiments, the determining of the group priority value associated with the first group includes determining the group priority value associated with the first group based at least on an analysis of the priority values associated with the first subset of the participant-evaluated responses and a number of times responses in the first subset of the participant-evaluated responses have been viewed by a participant.

In some embodiments, the post-processing includes determining the group priority value based at least on summing the priority values associated with the first subset of the participant-evaluated responses.

In some embodiments, the post-processing includes determining the group priority value at least by selecting a maximum priority value of a plurality of the priority values associated with the first subset of the participant-evaluated responses, the plurality of the priority values having been assigned by a particular participant performing at least part of the participant evaluation.

In some embodiments, the post-processing includes determining the group priority value at least by selecting a plurality of maximum priority values from at least some of the priority values associated with the first subset of the participant-evaluated responses, each of the maximum priority values representing a maximum priority value assigned by a respective participant performing at least part of the participant evaluation among responses in the first subset of the participant-evaluated responses. The post-processing may include determining the group priority value at least by summing the plurality of maximum priority values.

In some embodiments, the participant evaluation includes a participant prioritization of at least some of the plurality of processed responses. The participant prioritization may be a first participant prioritization, and the participant evaluation may include a second participant prioritization after the first participant prioritization. The second participant prioritization may be a participant prioritization of a highest priority subset of the at least some of the plurality of processed responses that were prioritized highest in the first participant prioritization.

In some embodiments, each respective page of the multiple pages is associated with a respective theme where only those processed responses associated with the respective theme are displayed on the respective page, and wherein at least some of the multiple pages are associated with a different theme than others of the multiple pages. In some embodiments, the method further comprises the step of generating at least some of the themes based at least on participant-input keywords.

Any of the features of any of the methods discussed herein may be combined with any of the other features of any of the methods discussed in herein. In addition, a computer program product may be provided that comprises program code portions for performing some or all of any of the methods and associated features thereof described herein, when the computer program product is executed by a computer or other computing device or device system. Such a computer program product may be stored on one or more computer-readable storage mediums.

For example, in some embodiments, a computer-readable data storage medium system comprises one or more computer-readable data storage mediums storing a program executable by one or more data processing devices of a data processing device system communicatively connected to an input-output device system, the program comprising: accessing instructions configured to cause accessing of a plurality of qualitative responses to inquiries from a processor-accessible memory device system; processing instructions configured to cause processing of the accessed plurality of qualitative responses to generate a plurality of processed responses; and distributing instructions configured to cause distributing of the plurality of processed responses over a network to each of a plurality of participant devices for participant evaluation on a display-screen-page-by-display-screen-page basis with each processed response presented on at least one of multiple display-screen-pages, and with each of the multiple display-screen-pages displaying a different set of the processed responses.

In some embodiments, each of any or all of the computer-readable data storage medium systems described herein is a non-transitory computer-readable data storage medium system including one or more non-transitory computer-readable storage mediums storing the respective program(s).

Further, any or all of the methods and associated features thereof discussed herein may be implemented as all or part of a device system or apparatus.

For example, in some embodiments, an inquiry-response evaluation device system comprises: a data processing device system; and a processor-accessible memory device system communicatively connected to the data processing device system and storing a program executable by the data processing device system, the program comprising: accessing instructions configured to cause accessing of a plurality of qualitative responses to inquiries from the processor-accessible memory device system; processing instructions configured to cause processing of the accessed plurality of qualitative responses to generate a plurality of processed responses; and distributing instructions configured to cause distributing of the plurality of processed responses over a network to each of a plurality of participant devices for participant evaluation on a display-screen-page-by-displayscreen-page basis with each processed response presented on at least one of multiple display-screen-pages, and with each of the multiple display-screen-pages displaying a different set of the processed responses.

For another example, in some embodiments, an inquiry-response evaluation device system comprises: a data processing device system; and a processor-accessible memory device system communicatively connected to the data processing device system and storing a program executable by the data processing device system, wherein the data processing device system is configured by the program at least to: access a plurality of qualitative responses to inquiries from a processor-accessible memory device system; process the accessed plurality of qualitative responses to generate a plurality of processed responses; and distribute the plurality of processed responses over a network to each of a plurality of participant devices for participant evaluation on a display-screen-page-by-display-screen-page basis with each processed response presented on at least one of multiple display-screen-pages, and with each of the multiple display-screen-pages displaying a different set of the processed responses.

For yet another example, in some embodiments, an inquiry-response evaluation device system comprises: a data processing device system; an input-output device system communicatively connected to the data processing device system; and a processor-accessible memory device system communicatively connected to the data processing device system and storing a program executable by the data processing device system, the program comprising: generating instructions configured to cause generation of a plurality of qualitative responses to inquiries based at least on user-input received via the input-output device system; transmitting instructions configured to cause transmission of the qualitative responses; receiving instructions configured to cause reception of processed responses derived from the qualitative responses; evaluation instructions configured to generate a user-interface via the input-output device system, the user-interface configured to facilitate user-evaluation of the processed responses on a display-screen-page-by-display-screen-page basis with each processed response presented on at least one of multiple display-screen-pages, and with each of the multiple display-screen-pages displaying a different set of the processed responses; and transmitting results of the user-evaluation.

Various systems may include combinations or subsets of all the systems and associated features thereof described herein.

BRIEF DESCRIPTION OF THE DRAWINGS

It is to be understood that the attached drawings are for purposes of illustrating aspects of various embodiments and may include elements that are not to scale.

FIGS. 7A and 7B illustrate respective display-screen-pages of at least a portion of a graphical user interface of a participant device of FIG. 2, according to some embodiments of the present invention.

DETAILED DESCRIPTION

Figure 1:
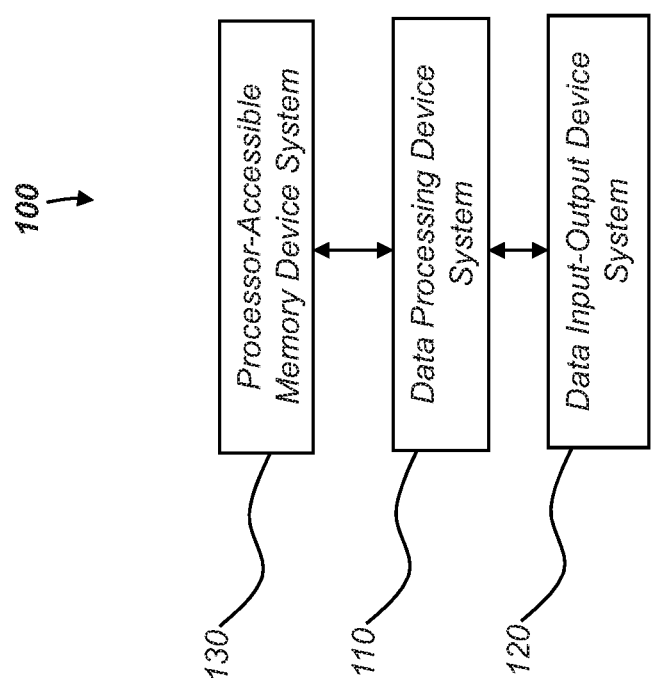
FIG. 1 illustrates a system configured to process qualitative responses, according to some embodiments of the present invention.

At least some embodiments of the present invention improve upon techniques for processing qualitative responses or other textual information. In some embodiments, participant-provided qualitative or comment-style responses to inquiries may be processed to generate processed responses, which may then be evaluated by participants for ranking. The ranking provides a streamlined approach to identifying the most important of the processed responses. The processed responses may reflect respective groups of similar qualitative responses to, among other things, simplify and reduce the amount of data that needs to be reviewed by the participants for ranking. The grouping may be performed via a user-interface (e.g., provided by input-output device system 120) by drag-and-drop or other procedures that simplify the grouping process. Groups of similar qualitative responses may further be grouped into themes or meta-groups to further simplify the process by which participants rank. In some embodiments, a user interface is configured to execute the participant ranking process on a display-screen-page-by-display-screen-page basis and, in some embodiments, each display-screen-page may be associated with a theme for the responses being ranked on that page. Such user-interface configurations further simplify the participant ranking process. In some embodiments, participant ranking or other evaluation is performed before grouping of responses, such that the participants essentially rank their own and other participants' 'raw' qualitative responses, and then grouping may be performed afterwards, e.g., on only the highest ranked qualitative responses. Grouping after participant ranking may have the benefit of, among other things, simplifying the grouping, which can be resource-expensive in some circumstances.

In the descriptions herein, certain specific details are set forth in order to provide a thorough understanding of various embodiments of the invention. However, one skilled in the art will understand that the invention may be practiced at a more general level without these details. In other instances, well-known structures have not been shown or described in detail to avoid unnecessarily obscuring descriptions of various embodiments of the invention.

Reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, the appearances of the phrases "in one embodiment" or "in an embodiment" or "in an example embodiment" or "in this illustrated embodiment" or "in this particular embodiment" and the like in various places throughout this specification are not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configure to A' includes a configuration to perform A, as well as the possibility of one or more other additional actions besides A. However, the phrase, 'configured only to A' means a configuration to perform only A.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 212, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). The word "module" may be defined as a set of instructions.

The word "device" and the phrase "device system" both are intended to include one or more physical devices or sub-devices (e.g., pieces of equipment) that interact to perform one or more functions, regardless of whether such devices or sub-devices are located within a same housing or different housings. In this regard, the word "device", may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

FIG. 1 schematically illustrates a production-based-evaluation system 100, according to some embodiments of the present invention. The system 100 may include a data processing device system 110, an input-output device system 120, and a processor-accessible memory device system 130. The processor-accessible memory device system 130 and the input-output device system 120 are communicatively connected to the data processing device system 110.

Figure 3:
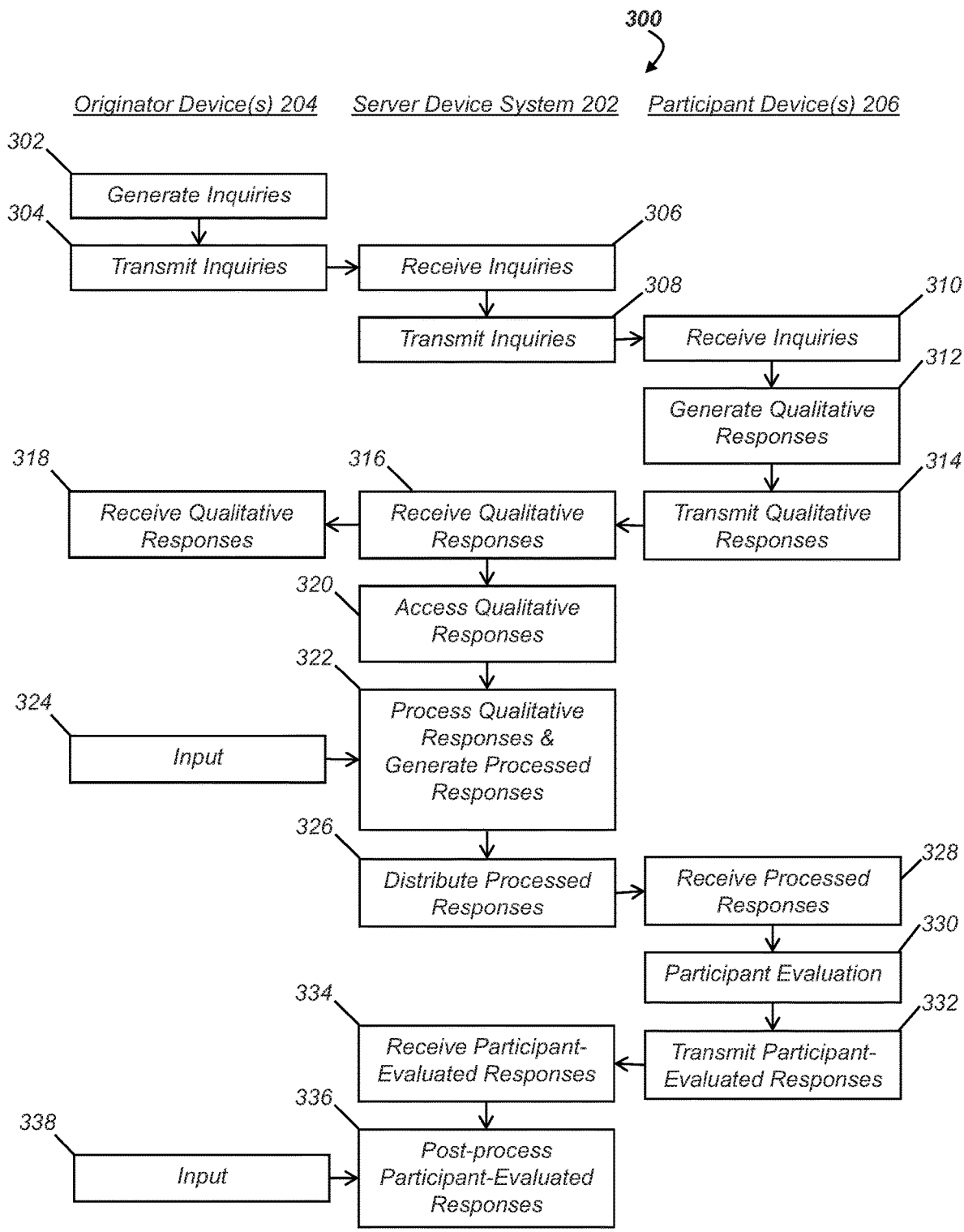
FIG. 3 illustrates a method of processing qualitative responses executed by at least part of the system of FIG. 1 or the system of FIG. 2, according to some embodiments of the present invention.

The data processing device system 110 includes one or more data processing devices that implement or execute, in conjunction with other devices, such as those in the system 100, methods of various embodiments of the present invention, including the example method of FIG. 3 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad (Trademark Apple Inc., Cupertino Calif.), a personal digital assistant, a cellular phone, a smartphone, or any other device for processing data, managing data, or handling data, whether implemented with electrical, magnetic, optical, biological components, or otherwise.

The memory device system 130 includes one or more processor-accessible memory devices configured to store program instructions and other information, including the information and program instructions needed to execute the methods of various embodiments, including the example method of FIG. 3 described herein. In this regard, each of the steps illustrated in the example method of FIG. 3 may represent program instructions stored in the memory device system 130 and configured to cause execution of the respective step. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 may be implemented by a single application-specific integrated circuit (ASIC) in some embodiments.

The input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving a selection, information, instructions, or any other data from other devices or systems described in various ones of the embodiments.

The input-output device system 120 also may include an image generating device system, a display device system, a computer, a processor-accessible memory device, a network-interface-card or network-interface circuitry, or any device or combination of devices to which information, instructions, or any other data is output by the data processing device system 110. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

Figure 2:
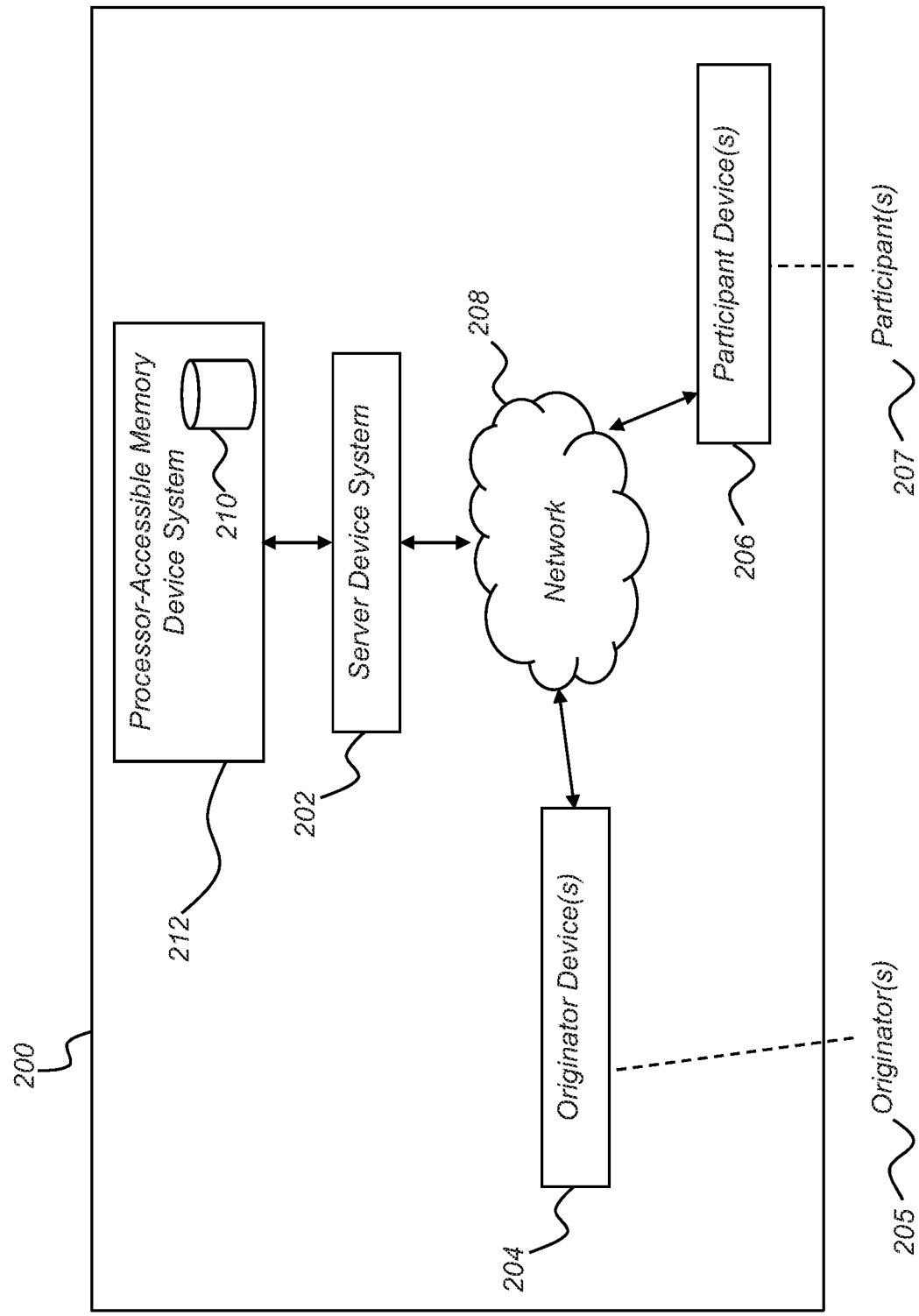
FIG. 2 illustrates some particular versions of the system of FIG. 1, according to some embodiments of the present invention.

According to some embodiments of the present invention, the data processing device system 100 includes the data processing device system 200 shown in FIG. 2, or vice versa. In this regard, the data processing device system 200 may include a server device system 202 (including one or more data processing devices), one or more originator devices 204 (each including one or more data processing devices), and one or more participant devices 206 (each including one or more data processing devices). The devices 202, 204, 206 may be communicatively connected to each other, for example, via a network 208. The network 208 may be the Internet, any local area network ("LAN"), any wide area network ("WAN"), or any other network know in the art. In addition, the network 208 is merely provided in FIG. 2 as an example of a communicative connection, and it should be noted that the network 208 may be replaced with any other communicative connection. A processor-accessible memory device system 212 may be communicatively connected to the server device system 202. In some embodiments, the processor accessible memory device system 212 includes one or more databases 210 that store, among other things, inquiries and participant responses to such inquiries, as discussed in more detail below.

The system 200 may facilitate one or more users or originators 205 acquiring information from one or more other users or participants 207. An originator 205 may be a manager or business owner, and the participants 207 may be employees who report to the manager or are employed by the business owner. However, the present invention is not limited to any particular originator 205 or participant 207. For example, in some embodiments, an originator 205 may be associated with an organization that is different than an organization to which the participants 207 belong, and the participants 207 need not belong to the same organization as each other. For instance, an originator 205 may be associated with an organization that conducts surveys, and the participants 207 may include anyone that responds to the survey.

In this regard, an originator 205 may input inquiries or questions into an originator device 204. At least some of these inquiries are open-ended and designed to prompt the participants 207 to provide qualitative, comment-style, discussion-like responses. The originator device 204 may transmit the input inquiries to the server device system 202 via the network 208 for storage in the processor-accessible memory device system 212, for example, by storage in one or more databases 210 stored in the processor-accessible memory device system 212.

The server device system 202 may transmit or distribute the inquiries (or derivatives thereof) to the participant devices 206, so that the participants 207 may respond to such inquiries via respective participant devices 206. These participant responses, referred to herein as "qualitative responses", (or derivatives thereof) may be transmitted by the respective participant devices 206 to the server device system 202 for storage in the processor-accessible memory device system 212, for example, by storage in the one or more databases 210 stored in the processor-accessible memory device system 212. In some embodiments, the server device system 202 processes the qualitative responses, possibly in response to input from an originator 205 via an originator device 204 to generate processed qualitative responses, or "processed responses". In this regard, the processed responses may be deemed a derivative of the qualitative responses. This processing of the qualitative responses may include removal of inappropriate qualitative responses, combining of duplicate responses, spell-checking, grammar checking, grouping of similar qualitative responses into groups, grouping the groups into themes, a combination of some or all of these processings, or other processing.

In some embodiments, the processed responses are distributed to the participant devices 206 for participant evaluation, such as ranking or prioritization, where each of some or all of the participants 207 have the opportunity to evaluate some or all of the responses earlier provided by other participants 207. The "participant-evaluated responses" may be transmitted from the respective participant devices 206 to the server device system 202 for storage in the processor-accessible memory device system 212, for example, by storage in the one or more databases 210 stored in the processor-accessible memory device system 212. The participant-evaluated responses may undergo post-processing by the server device system, which may involve input from one or more originators 205 via respective originator devices 204. This post-processing may include grouping the participant-evaluated responses into groups, especially if grouping was not performed on the original qualitative responses, grouping the groups into themes, summarizing the participant-evaluated responses into reports for analysis, a combination of some or all of these post-processings, or other post-processing. The above-discussed sequence of events is described in more detail below with respect to FIG. 3.

Although FIG. 2 illustrates a particular configuration of devices, the present invention is not limited to such configuration. For example, although the originator device(s) 204 and the participant device(s) 206 are shown separately in FIG. 2, it should be noted that an originator device 204 and a participant device 206 may be the same device, according to some embodiments of the present invention. For instance, an originator 205 and a participant 206 may operate the same device at different times. For another example, although FIG. 2 illustrates the server device system 202 as its own entity, the functions of the server device system 202 may be part of an originator device 204, part of a participant device 206, or both. For instance, the server device system 202 (including the processor-accessible memory device system 212) and an originator device 204 may be the same device (e.g., column 204 and column 202 in FIG. 3, discussed below may represent activity and communications with a same device), or the server device system 202 (including the processor-accessible memory device system 212) and a participant device 206 may be the same device (e.g., column 202 and column 206 in FIG. 3, discussed below may represent activity and communications with a same device). In some embodiments, the server device system 202, one or more originator devices 204, and one or more participant devices 206 are formed as a single device that executes the method 300 of FIG. 3, discussed below. For example, the entire system 200 may be formed as a single computer that both the originator(s) 205 and the participant(s) 207 use. For a more particular example, the entire system 200 may be formed as a single table computer that may be passed from an originator 205 to respective participants 207, with the server device system 202 and processor-accessible memory device system 212 implemented in that single tablet computer.

With respect to relationships between FIGS. 1 and 2, the processor-accessible memory device system 212 may correspond to the processor-accessible memory device system 130. The originator device(s) 204, the server device system 202, and the participant device(s) 206 may all correspond to the data processing device system 110. Alternatively, or in addition, each device of the originator device(s) 204, the server device system 202, and the participant device(s) 206 may all individually correspond to an implementation of the system 100. In some embodiments, the server device system 202 corresponds to the data processing device system 110, and each of the originator device(s) 204 and the participant device(s) 206 correspond to the data input-output-device system 120 that is communicatively connected (e.g., via the network 208) to the data processing device system 110, with the processor-accessible memory device system 212 may correspond to the processor-accessible memory device system 130. Similarly, in some embodiments, the originator device(s) 204 correspond to the data processing device system 110, and each of the participant device(s) 206 and the server device system 202 correspond to the data input-output-device system 120 that is communicatively connected (e.g., via the network 208) to the data processing device system 110, with the processor-accessible memory device system 130 comprising local memory of the respective originator device(s) 204. Similarly, in some embodiments, the participant device(s) 206 correspond to the data processing device system 110, and each of the originator device(s) 204 and the server device system 202 correspond to the data input-output-device system 120 that is communicatively connected (e.g., via the network 208) to the data processing device system 110, with the processor-accessible memory device system 130 comprising local memory of the respective participant device(s) 206.

Further, although the system 200 in FIG. 2 is shown to include all of the devices 202, 204, 206, 212, the system 200 may instead include a subset of these devices. For example, the system 200, in some embodiments, includes the server device system 202 and the processor-accessible memory device system 212, with the originator device(s) 204 and the participant device(s) 206 being excluded from the system 200, but being communicatively connected to the server device system 202 (e.g., via network 208). For another example, the system 200 may include an originator device 204 and the processor-accessible memory device system 212 directly connected to (or within a same housing as) the originator device 204, with the devices 206 and 202 excluded from the system 200, but (at least the server device system 202) being communicatively connected to the originator device 204. Similarly, the system 200 may include a participant device 206 and the processor-accessible memory device system 212 directly connected to (or within) participant device 206, with the devices 204 and 202 excluded from the system 200, but (at least the server device system 202) being communicatively connected to the participant device 206.

Further, FIG. 2 illustrates the processor-accessible memory device system 212 as being directly connected to the server device system 202. In this regard, because some or all of the devices 204 and 206 in FIG. 2 may be communicatively connected with each other, the processor-accessible memory device system 212 may be deemed to be communicatively connected to any of the devices 204, 206 indirectly, in some embodiments, e.g., by way of the server device system 202. However, in some embodiments, although FIG. 2 illustrates the processor-accessible memory device system 212 as being only connected to the server device system 210, the processor-accessible memory device system 212 may include, in some embodiments, some or all of the processor-accessible memory devices directly connected to (or within the same housing(s) of) the originator device(s) 204, the participant device(s) 206, and the server device system 202.

Accordingly, it can be seen that the invention is not limited to any particular arrangement of devices or communicative connections between devices, and those illustrated in FIG. 2 are merely provided as one possible example.

FIG. 3 illustrates a method 300 implemented or executed by the system 200 or the system 100, according to some embodiments of the present invention. In this regard, the method 300 provides examples of actions that may be performed by the originator device(s) 204, the server device system 202, and the participant device(s) 206, according to some embodiments.

At step 302, an originator device 204 generates open-ended inquiries requiring comment-style, qualitative responses, according to some embodiments. An example of such an open-ended inquiry that avoids a single-word (e.g., yes, no) answer may be, "How can your organization improve technologically?" The originator device 204 may generate these inquiries with the assistance of an originator 205. For example, the originator device 204 may be configured to provide a user interface for the originator 205, through which the originator 205 may type or otherwise input such inquiries. Upon generation of these inquiries, the originator device 204 may be configured to transmit such inquiries to the communicatively-connected server device system 202 through the network 208. See, e.g., step 304 in FIG. 3. In some embodiments, multiple originators 205 using one or more originator devices 204 collectively input such inquiries, and the respective subsets of such inquiries may be transmitted at step 304 by the respective originator devices 204 for accumulation at the server device system 202.

Upon receipt of the inquiries at step 306, the server device system 202 may store such inquiries in the processor-accessible memory device system 212 (or in one or more databases 210 stored therein). In order to obtain the responses to such inquiries, the server device system 202 may distribute or otherwise transmit, at step 308 via the network 208, the inquiries, or a link (e.g., a hyperlink) or other access capability to a storage location where the inquiries may be accessed, to each of a plurality of participant devices 206, where the participants 207 may input their responses to the inquiries. In this regard, the one or more originators 205 that assisted in the development of the inquiries may also provide a distribution list identifying the participants 207 that are to provide their responses to the inquiries. For example, an originator 205 may identify such participants 207 by selecting e-mail addresses from a contact book at an originator device 204, and the server device system 202 may distribute the inquiries, or a link (e.g., a hyperlink) or other access capability to a storage location where the inquiries may be accessed, at step 308 via e-mail. In this regard, it should be noted that the present invention is not limited to the manner in which participant devices 206 and their participants 207 gain access and provide responses to the inquiries.

At step 310, a participant device 206 receives the inquiries or at least access to the inquiries (e.g., by way of a hyperlink), according to some embodiments. In this regard, the participant device 206 may be configured to present the inquiries to the participant 207, possibly with the assistance of information provided by the server device system 202 (e.g., by way of javascript or HTML), via a user interface. It should be noted that the present invention is not limited to any particular user interface by which the inquiries are presented to and corresponding responses are received from the participant 207 at a participant device 206.

At step 312, the participant device 206 generates qualitative (e.g., open-ended, comment-based) responses to the inquiries based at least on input received from a participant 207. For example, a sequence of keyboard strokes reflecting a response to an inquiry from a participant 207 may be used by the participant device 206 to generate a qualitative response at step 312. The generated qualitative responses may be transmitted by the respective participant device 206 to the server device system 202 via the network 208 at step 314. When multiple participant devices 206 are providing qualitative responses, each of the one or more participant devices 206 may transmit the respectively generated qualitative responses to the server device system 202 at step 314 for accumulation.

The qualitative responses transmitted by the one or more participant devices 206 at step 314 may be received by the server device system 202 at step 316. The server device system 202 may store such qualitative responses in the processor-accessible memory device system 212 (or in the one or more databases 210 stored therein) at step 316. In some embodiments, the qualitative responses also are transmitted via the network 208 to one or more of the originator devices 204 or other devices at step 314 for review by one or more originators 205 or other users. See, e.g., step 318, where the qualitative responses are illustrated as being received by one or more originator devices 204. The transmission of the qualitative responses to one or more originator devices 204 or other devices may occur by way of the server device system 202 or directly (e.g., via the network 208, in some embodiments) from one or more of the participant devices 206. In this regard, it should be noted that a device that receives the qualitative responses at step 318 need not be an originator device 204, and may be a device associated with a user that was not an originator 205 of the inquiries that led to the qualitative responses. For example, it may be beneficial to have the qualitative responses transmitted to a manager or other decision-maker, other than an originator 205, for review.

At step 320, the server device system 202 accesses or retrieves the qualitative responses to the inquiries from the processor-accessible memory device system 212 (or the one or more databases 210 therein). At step 322, the server device system 202 processes the accessed qualitative responses to generate processed responses. In some embodiments, the processing at step 322 may include text or formatting corrections, such as spelling or grammar corrections, deletion or censoring of inappropriate responses, or the removal of identical responses. In this regard, in some embodiments, step 322 may be referred to as an approval step where moderating activities, such as corrective or censoring actions are performed. In some embodiments, the processing performed at step 322 may include combining (e.g., duplicate or substantially duplicate) qualitative responses, grouping the accessed qualitative responses, or generating themes for organizing groups of qualitative responses, as discussed below with respect to FIGS. 4-6. According to some embodiments, the processing performed at step 322 is performed based at least on input from one or more originator devices 204. See, e.g., step 324.

Figure 4:
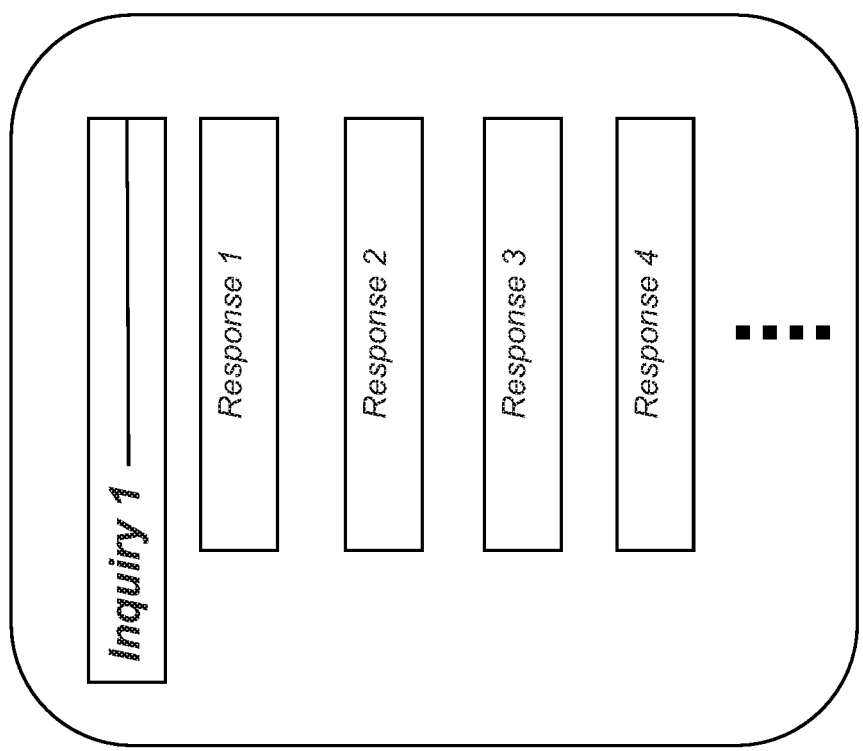
FIGS. 4-6 illustrate respective display-screen-pages of at least a portion of a graphical user interface of an originator device of FIG. 2, according to some embodiments of the present invention.
Figure 5:
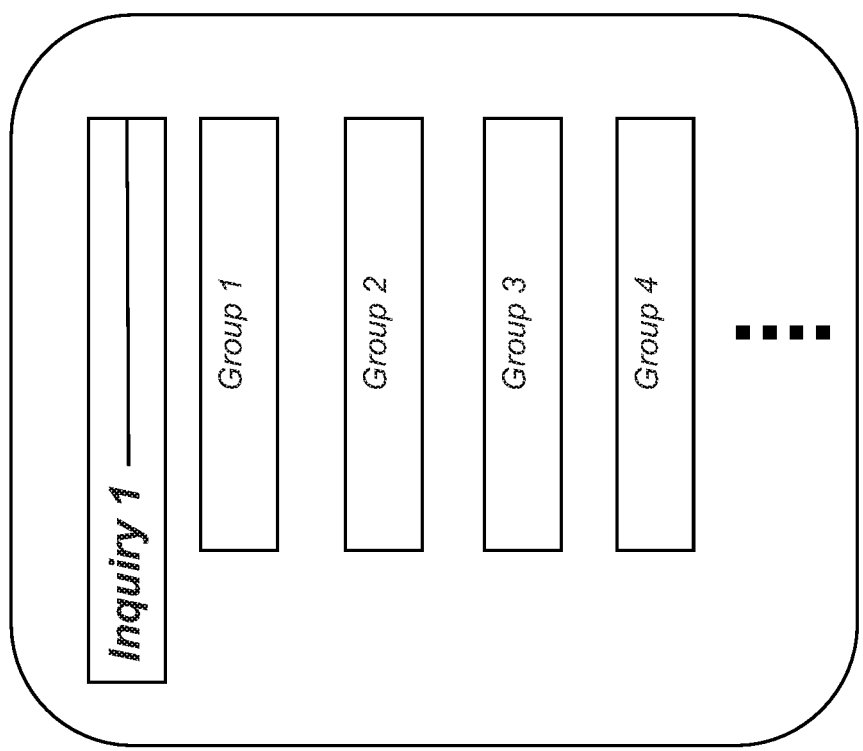
Figure 6:
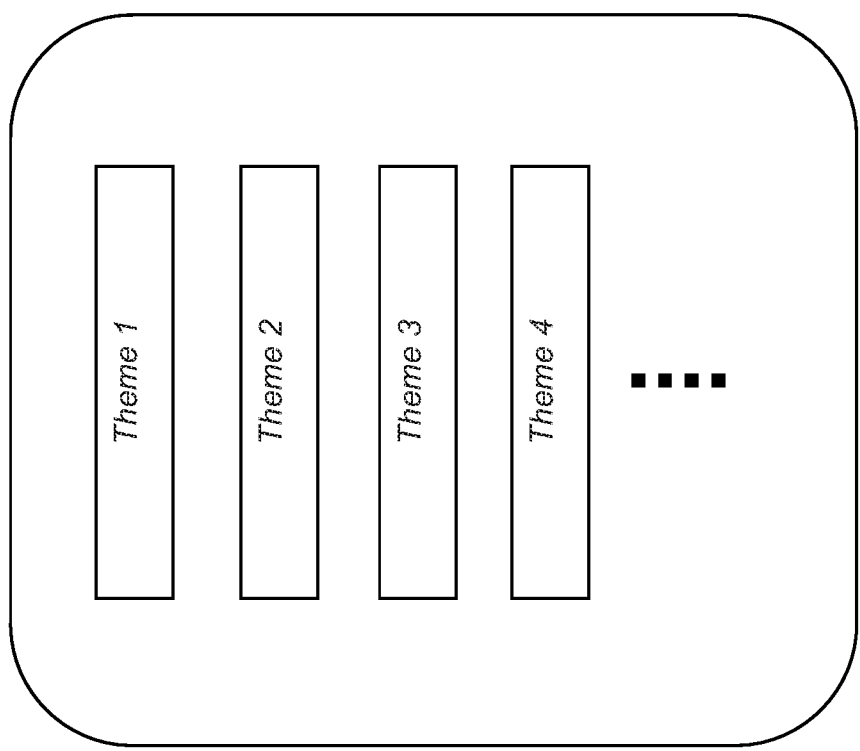

FIGS. 4-6 illustrate a user interface that may be presented by an originator device 204 to an originator 205 to facilitate the provision of the input at step 324, according to some embodiments of the present invention. (However, it should be noted that the graphical user interfaces of FIGS. 4-6 need not be displayed at an originator device 204 for an originator 205 and may, instead, be displayed at another device for another user.)

With respect to FIG. 4, an originator device 204 may be configured to display, on a graphical user interface, via a display device, a plurality of the qualitative responses provided by one or more participants 207. In the example of FIG. 4, only four qualitative responses ("Response 1" to "Response 4") to an inquiry ("Inquiry 1") are shown for ease of explanation. Of course, the present invention is not limited to any particular number of displayed qualitative responses. Additional qualitative responses to an inquiry (e.g., "Inquiry 1") or to other inquiries may be presented to an originator 205 on different display pages or screens, or on a same page by enabling display scrolling functionality. This discussion also applies to the user interfaces of FIGS. 7A, 7B, 8A, 8B, and 8C, discussed below.

In the example of FIG. 4, it should be noted that the boxes for "Inquiry 1", "Response 1", "Response 2", "Response 3", and "Response 4" are illustrated symbolically, and that such boxes would be replaced with the actual text of the respective inquiry and responses, for example, in an actual implementation of a user interface, according to some embodiments. For instance, the box label "Inquiry 1" in FIG. 4 might be replaced with the text, "How can your organization improve technologically?", the box label "Response 1" in FIG. 4 might be replaced with the text, "The support staff could use new computers", etc., according to some embodiments. This symbolic approach is used for each of the figures subsequent to FIG. 4 as well.

In order to group similar qualitative responses as part of the processing of step 322, according to some embodiments, an originator 205 may, via the user-interface, select a response, move the selected response at least partially over another response, and unselect the moved response in order to combine those two responses into a group. For example, a user might click, drag, and release box "Response 1" (FIG. 4) on top of box "Response 2" (FIG. 4) in order to create a group (e.g., box "Group 1" in FIG. 5) including "Response 1" and "Response 2". A result of creating a group may be the generation of a graphical representation of the group, such as the box "Group 1" in FIG. 5. For another example, a user might select, drag, or otherwise provide an indication via the user-interface that "Response 1" (FIG. 4) should be designated to become a group (e.g., box "Group 1" in FIG. 5), which, at first, includes only "Response 1". In this example, "Response 2" could be added by the user to the newly formed "Group 1", e.g., by clicking, dragging, and releasing "Response 2" on top of a graphical representation of the newly formed "Group 1", as described in more detail below, so that "Group 1" would now include both "Response 1" and "Response 2". In this regard, it should be noted that the present invention is not limited to any particular technique for creating a group of responses.

When combining qualitative responses into a group, the group may acquire or adopt title text (e.g., a title of the group) from a representative one of the qualitative responses that make up the group. For example, assume that "Response 1" is, "The support staff could use new computers," and that "Response 2" is, "Our computers are too old." If "Response 1" and "Response 2" are combined to create "Group 1", the title text of the qualitative responses represented by "Group 1" could be "The support staff could use new computers." In this regard, "Group 1" may be considered a "processed response" representing the qualitative responses "Response 1" and "Response 2", according to some embodiments. When a participant evaluates such a group (e.g., by prioritizing or ranking the group), the participant may rely on the title text of the group, inspect (e.g., by way of a graphical user interface on a participant device 206) the respective responses contained within the group, or both, to perform the evaluation.

Although in the example, the text of the qualitative response "Response 1" was used as the title text for "Group 1", the text of the qualitative response "Response 2", or text manually input by an originator 205, a participant 206, or other user may be adopted as the title text of the group. In the case of manual input of such text, one or more keywords input by one or more participants 207, originators 205, or other users may be used as the title text. The decision about what text of a qualitative response should represent the title text of a group may be provided by an originator 205 or other user, or may at least be initiated (e.g., by a default selection) by an originator device 204 or the server device system 202. For example, the text of the qualitative response (i.e., the "destination response") that is "landed on" by another qualitative response (i.e., the "source response") by an originator 205 via a select-move-and-unselect procedure may be used as a default selection for the title text represented by the newly created group. For instance, if an originator 205 selects "Response 1" (i.e., the source response in this example) and moves and releases it on "Response 2" (i.e., the destination response in this example) via the user interface of FIG. 4, the text of the qualitative response "Response 2" (i.e., the destination response in this example) may be used as the title text for "Group 1" (which is an example of a processed response from step 322). In other words, in some embodiments, the text of the destination response is used as the title text of the group. On the other hand, in some embodiments, the text of the qualitative response (i.e., the source response) that is "dragged-and-dropped" onto another qualitative response (i.e., the destination response) by an originator 205 via a select-move-and-unselect procedure may be used as a default selection for the title text represented by the newly created group. For instance, if an originator 205 selects "Response 1" (i.e., the source response in this example) and moves and releases it on "Response 2" (i.e., the destination response in this example) via the user interface of FIG. 4, the text of the qualitative response "Response 1" may be used as the title text for "Group 1" (which is an example of a processed response). In other words, in some embodiments, the text of the source response is used as the title text of the group. Accordingly, it should be noted that the present invention is not limited to any particular technique by which responses are grouped or by which groups are assigned title text. The process by which groups (or other response types, such as themes) are assigned title text also is referred to herein as "naming", such as naming a group or a theme.

In order to add qualitative responses to a newly created group, the user interface of an originator device 204 may be configured to allow an originator 205 to select a third qualitative response (e.g., "Response 3" in FIG. 4, and an example of a source response), move the third qualitative response at least partially over a graphical depiction of the newly created group (e.g., a box like "Group 1" in FIG. 5, and an example of a "destination group"), and unselect the third qualitative response in order to combine the third qualitative response with the newly created group. It should be noted, however, that the present invention is not limited to any particular technique for adding responses to an existing group. The title text assigned to the existing group to which an additional qualitative response is added may remain the same after the additional qualitative response is added, or it may be changed according to any one of the various techniques discussed above.

FIG. 5 illustrates a result of the grouping process described above with respect to FIG. 4, according to some embodiments of the present invention. Each group illustrated in FIG. 5 may include a set of similar qualitative responses and may itself represent a "processed response" to an inquiry (e.g., "Inquiry 1"). For example, box "Group 1" in FIG. 5 may represent a processed response that states, by way of its title text, "The support staff could use new computers," box "Group 2" in FIG. 5 may represent a processed response that states, by way of its title text, "We need more projectors for the conference rooms," and the box for "Group 3" may represent a different processed response, by way of its title text, etc. In other words, in some embodiments, each of the plurality of processed responses (e.g., "Group 1", "Group 2", "Group 3", and "Group 4" in FIG. 5) is or represents a different group of the plurality of qualitative responses accessed by the server device system 202 from the processor-accessible memory device system 212. In instances where at least two duplicate or identical qualitative responses are joined to form a single group, it may be said that the processing of step 322 includes combining at least two duplicate ones of the plurality of qualitative responses accessed at step 320 into a single group that is considered one processed response.

According to some embodiments, grouped qualitative responses may be further combined into themes or meta-groups. For example, the groups of FIG. 5 may be combined, according to the same grouping and naming techniques described above with respect to FIG. 4 for grouping responses, to form themes illustrated, for example, in FIG. 6. In this regard, the themes of FIG. 6 may have the same characteristics as the groups of FIG. 5, except that their constituent elements are groups instead of individual responses. As with the naming of groups discussed above with respect to FIG. 4, the themes of FIG. 6 may be named in the same manner, including manual naming by use of keywords input by one or more participants 207, originators 205, or other users.

Returning to FIG. 3, at step 326, the server device system 202 may distribute or otherwise transmit over the network 208 some or all of the processed responses generated at step 322 to each of a plurality of the participant devices 206 for participant evaluation, according to some embodiments. In this regard, in some embodiments, all of the processed responses are transmitted to each of a plurality of the participant devices 206 for participant evaluation.

However, in some embodiments, some or all of the processed responses are transmitted to participant devices 206, such that the server device system 202 distributes a different set of the plurality of processed responses over the network to each of at least some of the plurality of participant devices for the participant evaluation. For example, a first set of the processed responses generated at step 322 may be distributed by the server device system 202 over the network 208 to one of the plurality of participant devices 206 for participant evaluation, and a second set (different than the first set) of the processed responses may be distributed by the server device system 202 over the network 208 to another of the plurality of participant devices 206 for participant evaluation. In this regard, the first set, the second set, or each of the first set and the second set, may be a subset of processed responses generated at step 322. Such embodiments may allow each participant to evaluate a fewer number (e.g., less than all) of the processed responses. For example, if the processed responses generated at step 322 consist of five processed responses R1, R2, R3, R4, and R5, a first participant (e.g., at a respective first participant device) could evaluate processed responses R1 and R2 (e.g., a first subset of the processed responses), and a second participant (e.g., at a respective second participant device) could evaluate processed responses R3, R4, and R5 (e.g., a second subset of the processed responses). In this manner, the burden on each of the first participant and the second participant has been reduced (because neither had to evaluate all five processed responses), and, yet, all of the processed responses are evaluated. Such an approach may be suitable when more participants are available, so the total number of processed responses that need to be evaluated is able to be divided into sufficiently small subsets.

In some embodiments, the server device system 202 records which responses are distributed to each respective participant at step 326 in the processor-accessible memory device system 212. The respective participant device 206 may store this information in addition to or in lieu of the server device system 202. In the above-example, in some embodiments, the server device system 202, the respective participant device 206, or both, may record that the first participant is to receive the first subset of processed responses including responses R1 and R2, and that the second participant is to receive the second subset of processed responses including responses R3, R4, and R5. Recording this information may be beneficial in situations where a participant does not complete the participant evaluation of step 330 in one session. In this case, it may be important to ensure that when the participant starts the second session to complete the evalution that the participant sees the same subset of processed responses. In this regard, in some embodiments, the server device system 202, the respective participant device 206, or both, may record participant-evaluation-session information, such as the processed responses that have been viewed (e.g., via a screen like FIG. 7A, FIG. 7B, FIG. 8A, or FIG. 8B, discussed below), by the respective participant, the processed responses that have been prioritized (assigned a priority (e.g., a star) value) by the respective participant, or both, to aid in managing multi-session participant evaluations.

In some embodiments, it may be beneficial to track the number of times each processed response has been participant-evaluated, in order to ensure that each processed response has been distributed or participant-evaluated a sufficient (e.g., a user-defined threshold) number of times. In this regard, in some embodiments, the server device system 202 may record a number of times each of at least some of the plurality of processed responses has been placed in a subset as part of step 322 or 326 for evaluation by a particular participant at step 330. In some embodiments, in addition to or in lieu of recording a number of times each of at least some of the plurality of processed responses has been placed in a subset as part of step 322 or 326 for evaluation by a particular participant at step 330, the server device system 202 may record a number of times each of at least some of the plurality of processed responses has been participant-evaluated, based at least on information provided by the respective participant devices. In some embodiments, "participant-evaluated", in this context, means that the processed response has been presented to the participant (e.g., displayed on a screen like FIG. 7A, FIG. 7B, FIG. 8A, or FIG. 8B, discussed below), regardless of whether or not the respective participant actually prioritized (e.g., assigned a priority (e.g., a star) value to) the processed response. (Some embodiments do not require that a priority be assigned to each processed response, while other embodiments do so require.) In some embodiments, "participant-evaluated", in this context, means that the processed response has been prioritized (e.g., assigned a priority (e.g., a star) value) by the respective participant. Either or both definitions may be preferred and implemented in various circumstances.

With some or all of this information (i.e., one or more of the recorded numbers of times discussed above), the server device system 202 (with or without user input, e.g., from an originator device 204) may be configured by a program stored in memory device system 212 to ensure that each of the processed responses is evaluated at step 330 the same or approximately the same number of times. For example, when generating a plurality of subsets of processed responses for distribution at step 326, each subset directed to a particular participant (or participant device 206), the server device system 102 (with or without user input, e.g., from an originator device 204) may perform a "Flattening Process" to ensure that such subsets, collectively, represent the same or approximately the same number of occurrences of each processed response.

For example, in some embodiments, the distribution of step 326 or the evaluation at step 330 occurs over a period of time, such that the respective subsets of processed responses evaluated by respective participants at step 330 are generated over a period of time. In some of these embodiments, the server device system 202 may record the number of times the that each processed response has been distributed for evaluation at step 326 or evaluated at step 330, so that when a new subset of processed responses is to be generated for distribution at step 326, evaluation at step 330, or both, the server device system 202 chooses processed responses that are associated with a number of times fewer than others of the processed responses to be included in that new subset. This approach has the effect of evening out the recorded numbers of times.

However, the generation of the subsets of processed responses for distribution at step 326 and evaluation at step 330 need not occur over an extended period of time, and, instead, may occur contemporaneously, such that the server device system 202 generates a plurality of subsets of processed responses for distribution to and evaluation by respective participants at step 326 and step 330 that exhibit an equal or substantially equal number of occurrences among all of the plurality of processed responses to be evaluated at step 330.

In some embodiments, when generating a plurality of subsets of processed responses for distribution at step 326, the server device system 202 (with or without user input, e.g., from an originator device 204) may perform a "Diversification Process" to ensure that each subset directed to a particular participant (or participant device 206) represents processed responses originating from a diverse group of participants. For example, according to some embodiments, demographic or other information about the participants that generate the qualitative responses at step 312 may be stored in the memory device system 212 and used by the server device system 202 (with or without user input, e.g., from an originator device 204) to generate diverse groups of processed responses for each subset of processed responses to be distributed at step 326 to respective participants. For instance, assuming that geographic diversity is desired, each subset of processed responses to be distributed at step 326 to respective participants may be generated to include processed responses originating (e.g., at step 312) from participants from a plurality of different geographic regions. It should be noted, however, that the invention is not limited to geographic diversity and includes any particular type of diversity or combination of different types of diversity in this regard, such as employment status, gender, income bracket, political preference, religion, or any other characteristic of a participant that can be asked, e.g., in a multiple choice question. In the case of employment status, a school district may seek the opinions from both parents (non-employees representing one group of participants) and employees (e.g., teachers representing another group of participants). In this case, the above-discussed Diversification Process may cause each subset of processed responses to be distributed at step 326 to respective participants to include processed responses from both parents and employees to ensure diversity.

On the other hand, according to some embodiments of the present invention, the server device system 110 (with or without user input, e.g., from an originator device 204) executes a "Similarity Process" to ensure that each subset of processed responses for distribution to a respective participant at step 326 includes processed responses originating from one or more other participants that have one or more similarities with the respective participant that is to perform the evaluation at step 330. For example, if a school district is seeking the opinions from both parents (as one group of participants) and employees (as another group of participants), it may be beneficial in certain circumstances to have parents evaluate at step 330 processed responses originating only from other parents, whereas employees (e.g., teachers) may be caused to evaluate at step 330 processed responses originating only from other employees. In this regard, the present invention is not limited to any particular type of similarity or combination of similarities between the evaluating participant (e.g., step 330) and the originating participant(s) that originated (e.g., at step 312) the processed responses being evaluated by the evaluating participant at step 330. For example, the types of similarities may include one or more of the types of diversity discussed, above, such as geographic, employment status, gender, income bracket, political preference, religion, or any other characteristic of a participant that can be asked, e.g., in a multiple choice question.

In this regard, it may be important in certain circumstances for a participant to see his or her own responses generated at step 312 when such participant performs the evaluation at step 330. In particular, if the participant sees his or her own responses during the evaluation of step 330, such participant may experience a greater sense of participation in the process 300 and may feel that his or her contribution at step 312 is valued and important. Accordingly, in some embodiments of the present invention, each subset of processed responses for distribution to a respective participant at step 326 for evaluation of step 330 includes at least the responses that respective participant generated at step 312. This process of ensuring that each subset of processed responses for distribution to a respective participant at step 326 for evaluation of step 330 includes at least the responses that respective participant generated at step 312 may be referred to as an "Own Response Process".

In some embodiments, the above-discussed Flattening Process may be executed in conjunction with the above-discussed Diversification Process, the Similarity Process, the Own Response Process, or a combination of at least some of these or other processes. For example, assume that the server device system 110 is generating a subset S1 of four processed responses from the set of processed responses R1-R7 shown in Table I, below, to be delivered at step 326 to a participant P1.

TABLE I

| | Originating Participant | Participant Status | # Times Used |
|---|---|---|---|
| R1 | P1 | Teacher | 8 |
| R2 | P2 | Parent | 4 |
| R3 | P3 | Parent | 12 |
| R4 | P1 | Teacher | 7 |
| R5 | P4 | Teacher | 7 |
| R6 | P5 | Parent | 9 |
| R7 | P6 | Parent | 8 |

Also assume, for example, that the above-discussed Flattening Process is being executed in conjunction with the above-discussed Diversification Process and the Own Response Process. Also assume that the Own Process takes priority over the Diversification Process and the Flattening Process, and that the Diversification Process takes priority over the Flattening Process. In this example, according to some embodiments, the subset S1 of four processed responses to be delivered at step 326 to participant P1 for evaluation at step 330 will include responses R1 and R4, because those responses were generated by participant P1 at step 312, as indicated by the "Originating Participant" column in Table I, and according to the Own Response Process. Since participant P1 is a teacher, and, therefore, responses R1 and R4 are both responses from a teacher as indicated by the "Participant Status" column in Table I, the Diversification Process may attempt to fill the two remaining response-places in the subset S1 with responses from a parent. Responses R2, R3, R6, and R7 meet this criteria. In order to select which two of responses R2, R3, R6, and R7, the Flattening Process may select the two responses that have been used (e.g., in other subsets of responses to be delivered at step 326 or, e.g., have been evaluated by a participant at step 330) the fewest number of times, according to the "# Times Used" column in Table I. In this example, R2 and R7 would be selected for inclusion in subset S1, so that subset S1 would finally include responses R1, R2, R4, and R7.

At step 328, each of the respective participant devices 206 may receive the processed responses (e.g., respective subsets of processed responses), or a link (e.g., a hyperlink) or other access capability to a storage location where the processed responses may be accessed, from the server device system 202, and the participant evaluation may occur at step 330.

In some embodiments, the participant evaluation at step 330 includes a participant prioritization of at least some of the plurality of processed responses. In this regard, the participant evaluation may provide an opportunity for each of the participants 207 to review their own responses in addition to responses of other participants 207 and, within this context, prioritize or rank which responses the respective participant 207 believes are more important than other responses.

One potential difficulty associated with such a participant evaluation procedure may occur when the number of processed responses (e.g., from step 322) is large, which can cause 'information overload' for the participants 207. In this regard, the grouping of responses, the grouping of groups according to themes, or both, which may be implemented at least as part of the processing of step 322, may mitigate this difficulty. However, in situations where grouping does not occur at step 322 or where the number of groups generated at step 322 is large, one or more additional 'information overload' mitigation techniques may be required as part of the participant evaluation of step 330.

According to some embodiments, one of these mitigation techniques includes presenting different sets of processed responses (e.g., generated at step 322) on a display screen or display-screen-page-by-display-screen-page basis, so that the participant 207 has manageable 'bite-size' chunks or segments of information to evaluate at any one period of time. For example, the participant evaluation of step 330 may, in some embodiments, present processed responses on a display-screen-page-by-display-screen-page basis. Each processed response may be presented on at least one of multiple display-screen-pages, with each of the multiple display-screen-pages displaying a different set of the processed responses.

For instance, FIG. 7A and FIG. 7B illustrate a user interface provided by a participant device 206 through which participant evaluation of processed responses (e.g., generated at step 222) by a participant 207 may occur, according to some embodiments. FIG. 7A illustrates a first display screen or page 700 of the user interface that allows a participant 207 to evaluate or rank a subset 702 of the plurality of processed responses (e.g., generated at step 322). In some embodiments, a participant 207 assigns a priority or rank 704 to each of the processed responses in the subset 702. In the example of FIG. 7A, the participant 207 assigns a low priority or rank (e.g., one star) to a first processed response "Group 1", a higher priority or rank (e.g., two stars) to a third processed response "Group 7", and an even higher priority or rank (e.g., three stars) to a second processed response "Group 4". The first processed response "Group 1" and the second processed response "Group 4" may correspond to the processed responses "Group 1" and "Group 4", respectively, shown in FIG. 5. Although FIG. 7A and the subsequent figures illustrate the use of a star-based ranking system, it should be noted, however, that the present invention is not limited to any particular technique for prioritizing or ranking processed responses. Although FIG. 7A and each of the subsequent figures respectively illustrate a particular number of processed responses for the participant 207 to evaluate, the present invention is not limited to any particular number, and, in some embodiments, the number of processed responses presented for evaluation on any one display screen or page may be user-customizable, e.g., defined by an administrator, an originator 205, each respective participant 207 for their own respective user-interface, or other user.

A participant 207 may proceed to evaluate another subset of processed responses on another display screen or page by use of navigation controls provided by the user-interface. FIG. 7A illustrates an example of such navigation controls as a forward-page software button (also referred to as a forward navigation button) 706 and a backward-page software button (also referred to as a backward navigation button) 708. It should be noted, however, that the present invention is not limited to any particular technique for navigating display screens or display pages.

In some embodiments, selection of the forward-page software button 706 by a participant 207 causes the display of a second display screen or page 710 of the user interface shown at FIG. 7B. This second page 710 includes a different subset 712 of the plurality of processed responses (e.g., generated at step 322) than the subset 702. In some embodiments, each of the plurality of processed responses (e.g., generated at step 322) is presented on only one of the multiple display-screen-pages (e.g., 700, 710, etc.). That is, in some embodiments each of the plurality of processed responses (e.g., generated at step 322) is not present in more than one of the multiple display-screen-pages. Compare, for example, FIG. 7A and FIG. 7B, where no group number is duplicated. However, in other embodiments, each of one or more of the plurality of processed responses (e.g., generated at step 322) may be displayed on more than one display-screen-page. For example, it may be beneficial, in certain contexts, to have a participant see a particular processed response alongside different sets of other processed responses to see how the participant's evaluation might change with respect to the particular processed response. Compare, for example, FIG. 8A and FIG. 8B, where the processed response "Response 4" is presented on both the display screens or pages 800 and 810, where the display screen or page 800 presents a first subset of processed responses 802, and the display screen or page 810 presents a second subset of processed responses 812 different than the first set 802. In other words, at least two of multiple-display-screen-pages may display a same one of the processed responses at a same one of the participant devices 206.

Returning to FIG. 7B, the participant 207 may prioritize or rank the processed responses (e.g., "Group 2" and "Group 3") in the subset 712 as discussed with respect to FIG. 7A. In addition, the participant 207 may advance to a next display screen or page via the forward navigation button 706, or return to view or modify the prioritizations performed in the preceding display screen or page 700 via the backward navigation button 708.

As illustrated in FIG. 7A and FIG. 7B, according to some embodiments, each respective page (e.g., 700, 710) of multiple display screen pages may be associated with a respective theme (e.g., 720, 722, respectively) where only those processed responses (e.g., 702, 712, respectively) associated with the respective theme are displayed on the respective page. In some embodiments, at least some of the multiple pages are associated with a same theme. In some embodiments, at least some of the multiple pages are associated with a different theme (e.g., themes 720, 722) than others of the multiple pages.

Figure 8B:
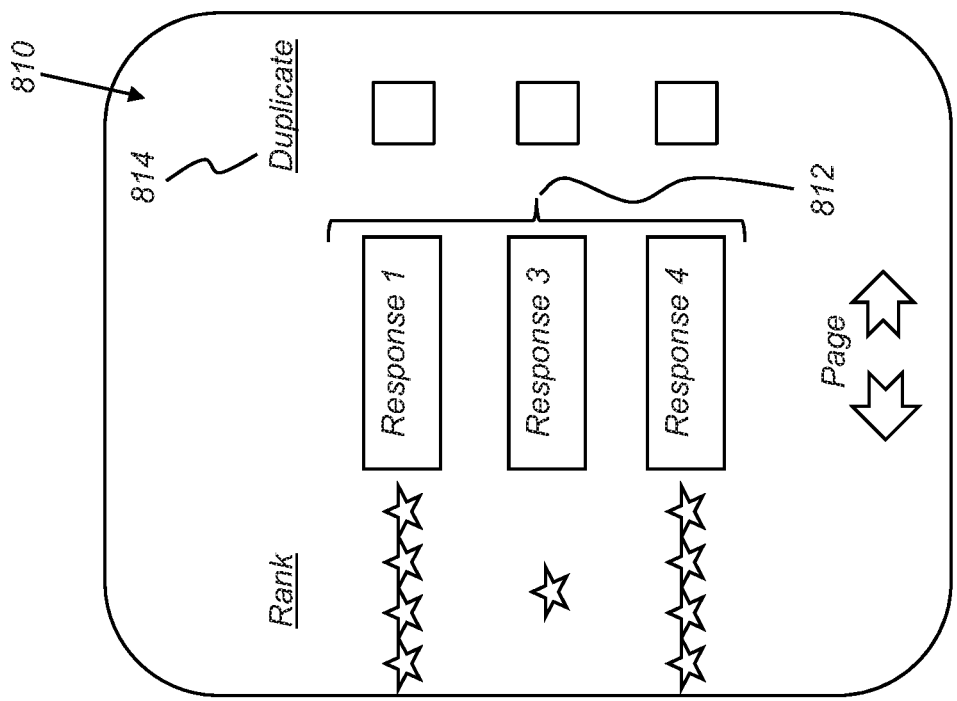
FIGS. 8A, 8B, and 8C illustrate respective display-screen-pages of at least a portion of a graphical user interface of a participant device of FIG. 2, according to some embodiments of the present invention.
Figure 8A:
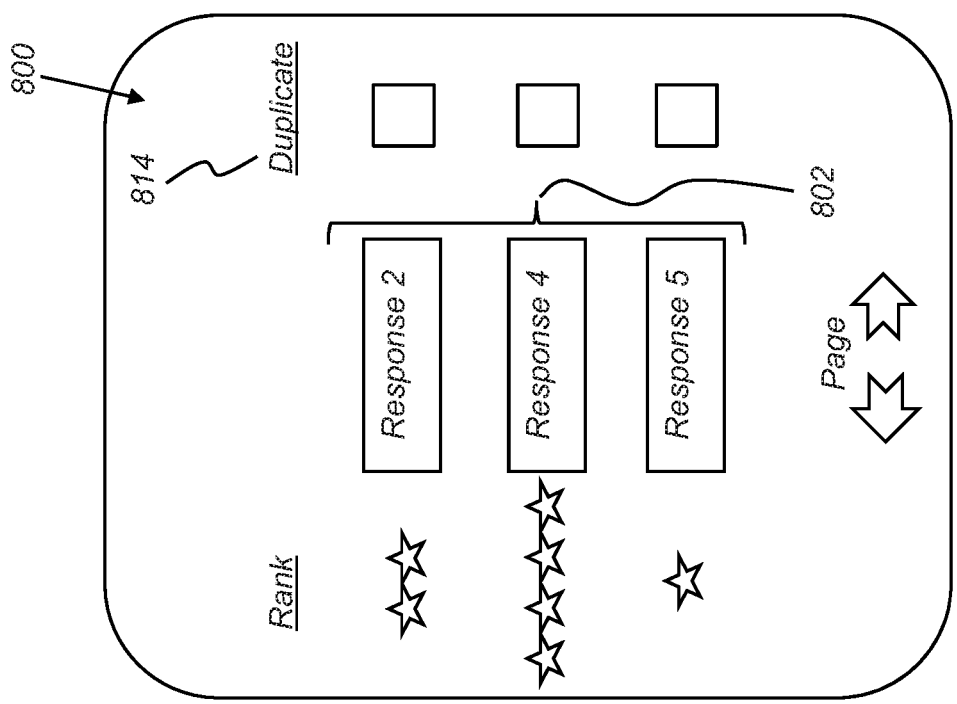

According to some embodiments of the present invention, FIG. 8A and FIG. 8B illustrate a user interface on a participant device 206 like that described above with respect to FIG. 7A and FIG. 7B, except that the processed responses are not groups. Instead, the processed responses in FIG. 8A and FIG. 8B are individual qualitative responses (e.g. corresponding to at least some of those generated at step 312 in FIG. 3), according to some embodiments. Such embodiments may be beneficial in certain contexts at least because they may eliminate the need to perform some or all of the grouping that is performed at step 322 in some embodiments, although elimination of duplicate or inappropriate responses at step 322 may still be performed. In other words, in some embodiments, the processing at step 322 does not include grouping similar qualitative responses, such that each of a plurality of processed responses generated at step 322 does not represent or correspond to multiple similar qualitative responses, but, instead, each of the plurality of processed responses generated at step 322 represents or corresponds to a different one of the plurality of qualitative responses (e.g., accessed at step 320).

In this regard, the grouping of similar qualitative responses that may be performed at step 322 may require the use of an expert originator 205 to effectively create the groups of similar qualitative responses, and, therefore, may be cost inefficient. Accordingly, in embodiments where this grouping of similar qualitative responses is not performed at step 322, the participants 207 may be presented essentially with all or most of the 'raw' qualitative responses generated by the participants 207 at step 312. An example of this participant evaluation of 'raw' qualitative responses is illustrated in FIG. 8A and FIG. 8B, where, e.g., "Response 1" in FIG. 8B, "Response 2" in FIG. 8A, "Response 3" in FIG. 8B, and "Response 4" in FIG. 8B may correspond to the equivalent responses in FIG. 4 in a case where no grouping of similar responses is performed at step 322 (although other processing, such as elimination of duplicates or inappropriate responses, spell checking, grammar checking, or other processing may still be performed at step 322 (e.g., as part of an approval step) in such embodiments). In at least some of these embodiments, the grouping of individual qualitative responses, the grouping of groups into themes, or both, may instead be performed (if at all) after the participant evaluation of step 330, for example, at a post-processing step (e.g., 336 discussed below). In some embodiments, the grouping of individual qualitative responses, the grouping of groups into themes, or both performed after the participant evaluation of step 330 may be performed on only those qualitative responses evaluated at step 330 to have a priority above a threshold priority. In this manner, the number of qualitative responses that have to be grouped is reduced, which may be beneficial in certain contexts.

In embodiments such as those encompassing FIG. 8A and FIG. 8B where participants 207 are evaluating ungrouped qualitative responses, and the removal of duplicate responses has not occurred at step 322, the user interfaces of the participant devices 206 may be configured to allow a participant 207 to flag a qualitative response as a duplicate. Although the present invention is not limited to any particular technique for identifying duplicate qualitative responses, FIG. 8A and FIG. 8B respectively show a sequence of check boxes under a heading "Duplicate" 814. Because it may be easier to identify duplicate qualitative responses, i.e., responses that cover essentially the same subject matter, than it is to identify similar responses involved in the grouping described, for example, with respect to FIG. 4 and FIG. 5, the task of identifying duplicate responses may be appropriate for participants 207, who may not be experts like an originator 205, according to some embodiments.

Figure 8C:
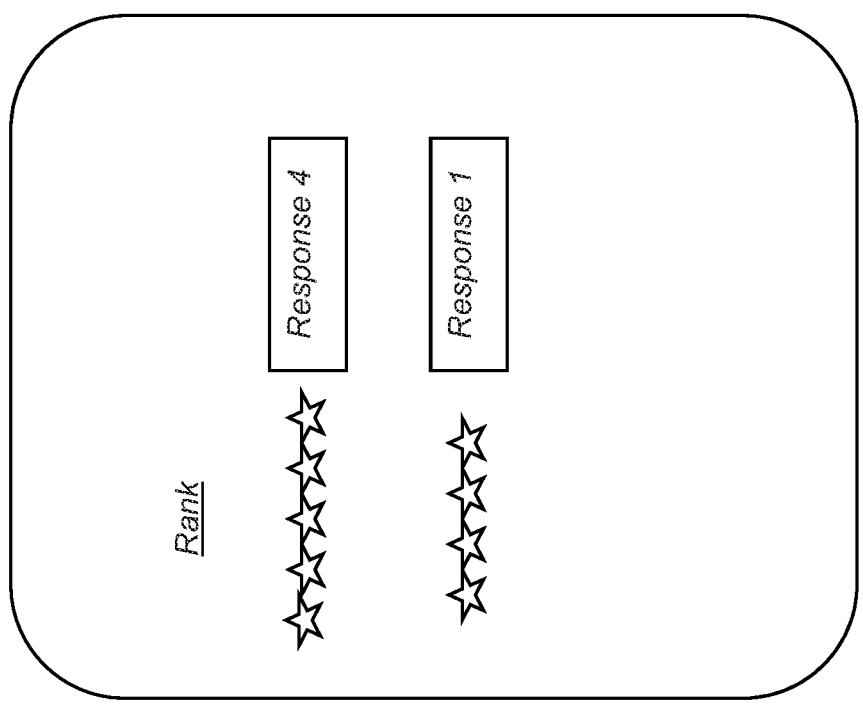

In embodiments encompassing the examples of FIG. 8A and FIG. 8B, one or more participants 207 may rank or prioritize the respective processed responses (e.g., in subsets 802, 812) as described above with respect to FIG. 7A and FIG. 7B. In some embodiments, the ranking or prioritization illustrated, e.g., in each of (a) FIGS. 7A, 7B and (b) FIGS. 8A, 8B may be considered a first participant prioritization. In this regard, in some embodiments, the participant evaluation of step 330 may include this first participant prioritization followed by a second participant prioritization, the second participant prioritization being a participant prioritization of a highest priority subset of the processed responses that were prioritized highest in the first participant prioritization. For example, in a first participant prioritization of FIGS. 8A, 8B, processed response "Response 4" in FIG. 8A and FIG. 8B and processed response "Response 1" in FIG. 8B are respectively prioritized with four stars. According to some embodiments, it may be beneficial to have the respective participant 207 view these highest-priority processed responses again, but together, as shown in FIG. 8C, for example, so that the respective participant 207 has an opportunity to be certain about which processed responses the respective participant 207 truly believes are the most important processed responses. In the example of FIG. 8C, the respective participant 207 may opt to increase the ranking or priority of "Response 4" to five stars, so that it now has a higher ranking or priority than "Response 1".

Results of the participant evaluation performed at step 330 may be transmitted as participant-evaluated-responses at step 332 by the respective participant devices 206 to the server device system 202 via the network 208 for accumulation. If participants 207 provided indications of duplicate responses, e.g., by way of the check boxes under the heading 814, the transmissions at step 332 may include such indications.

The server device system 202 may be configured to receive the participant-evaluated responses (and possibly any indications of duplicate processed responses) at step 334 and to store such responses in the processor-accessible memory device system 212 (or the one or more databases 210 stored therein), according to some embodiments. It may be deemed that the receiving of the participant-evaluated responses at step 334 occurs in response to the distributing of the processed responses at step 326, according to some embodiments.

Post-processing of the received participant-evaluated responses by the server device system 202 may be performed at step 336. Such post-processing may be based at least on input received by the server device system 202 from one or more of the originator devices 204, as shown at step 338. In some embodiments, the post-processing of step 226 accounts for the participant indications of duplicate processed responses, e.g., by eliminating the duplicates in accordance with those participant indications. In embodiments where the grouping of similar qualitative responses, the grouping of groups into themes, or both, does not occur at step 322, such grouping may occur, as discussed above, as at least part of the post-processing of step 336 on at least a subset of the participant-evaluated responses. In this regard, the input at step 338 may correspond to the input discussed above with respect to step 324. However, in some embodiments, such grouping need not be performed on all participant-evaluated responses at step 336 and may, instead, be performed on a subset of all of the participant-evaluated responses, such as only the highest priority or highest ranked participant-evaluated responses (e.g., above a threshold priority or rank, which may be user-defined).

As discussed above, in some embodiments, the post-processing of step 336 includes the grouping of similar qualitative responses, the grouping of groups into themes, or both, discussed above with respect to step 322 on at least a subset of the participant-evaluated responses received by the server device system 202 at step 334. This grouping, when performed at least as part of step 336 may be referred to as a "Discovery Process", where, e.g., one or more originators learn what responses are important to the participants. In some embodiments, such grouping performed at step 336 includes determining a priority assigned to a group based at least on an analysis of the priorities assigned to the group's constituent participant-evaluated responses.

For example, assume that a group of participant-evaluated responses is formed at step 336 consisting of a first participant-evaluated response "R1" and a second participant-evaluated response "R2". Also assume that response R1 was evaluated by a first participant P1 to have two stars, and that the response R2 was evaluated by the first participant P1 to have three stars. Also assume that response R1 was evaluated by a second participant P2 to have one star, and that the response R2 was evaluated by the second participant P2 to have two stars, as shown in Table II, below, where the asterisks represent the participant-assigned star values.

TABLE II

|    | P1  | P2 |
|----|-----|----|
| R1 | **  | *  |
| R2 | *** | ** |

In a situation such as this, when responses R1 and R2 are grouped into a group "G1", some embodiments of the present invention determine and assign a priority to group G1 based on the priorities (star-values, in this example) assigned to the constituent responses R1 and R2 at step 330.

In some embodiments, a "Summing" method is executed, e.g., by the server device system 202 (with or without user input, e.g., from an originator device 204) at step 336 to determine the priority or "group priority value" to be assigned to or associated with the group G1. According to this Summing method, in some embodiments, all of the priorities (star-values, in this example) assigned by all participants to all constituent responses in the group are summed, and the resulting sum-value is assigned as the priority for the group. In the example of Table II, the priorities assigned by participant P1 for response R1 and response R2 are summed to form a first sub-total value, the priorities assigned by participant P2 for response R1 and response R2 are summed to form a second sub-total value, and then the first and second sub-total values are summed to identify a total priority value or "group priority value" (which may be one of several group priority values) assigned to or associated with the group (e.g., in memory device system 212), as shown in Table III, below.

TABLE III

|    | P1 | P2 |   |
|----|----|----|---|
| R1 | ** | *  |   |
| R2 | ***| ** |   |
| | First Sub-Total Value = ***** | Second Sub-Total Value = *** | G1 Total Priority Value = ******** |

In some embodiments, a "Maxing" method is executed, e.g., by the server device system 202 (with or without user input, e.g., from an originator device 204) at step 336 to determine the priority or "group priority value" to be assigned to or associated with the group G1. This Maxing method may be executed in addition to (i.e., resulting in multiple assigned priorities) or in lieu of the "Summing" or other group-priority-determination method. According to the Maxing method, in some embodiments, the maximum priority assigned by a participant among all of the constituent responses belonging to the group in question is assigned as a respective sub-total value (or "maximum priority value") associated with that participant. This same maximum-priority process is executed for each participant, and then all of the respective sub-total values (or "maximum priority values") are summed to arrive at the priority or "group priority value" to be assigned to associated with the corresponding group. In the example of Table II, the maximum priority that participant P1 assigned to constituent responses R1 and R2 is the three stars that participant P1 assigned to response R2. Therefore, according to the Maxing method, the first sub-total value (or "maximum priority value") associated with participant P1 is assigned the value of three stars, corresponding to the three stars that participant P1 assigned to response R2. Similarly, the maximum priority value that participant P2 assigned to constituent responses R1 and R2 is the two stars that participant P1 assigned to response R2. Therefore, according to the Maxing method, the second sub-total value (or "maximum priority value") associated with participant P2 is assigned the value of two stars, corresponding to the two stars that participant P2 assigned to response R2. Then, the first and second sub-total values (e.g., "maximum priority values") are summed to identify a total priority value or "group priority value" (which may be one of several group priority values) assigned to or associated with the group (e.g., in memory device system 212), as shown in Table IV, below.

TABLE IV

|    | P1  | P2 |
|----|-----|----|
| R1 | **  | *  |
| R2 | *** | ** |

TABLE IV-continued

| | P1 | P2 | |
| --- | --- | --- | --- |
| | First Sub-Total Value = *** | Second Sub-Total Value = ** | G1 Total Priority Value = ***** |

The Summing approach may be beneficial in circumstances where it is valuable to capture the entirety of the assigned-priority data set. In other words, there is no data loss in the Summing approach. The Maxing approach may be beneficial as it does not allow the priority associated with any particular participant to exceed a maximum value. For example, if five-stars is the maximum priority value that a participant can assign to a response, the sub-total value (e.g., the bottom cell in each of the P1 and P2 columns in Table IV) corresponding to any particular participant will not exceed that maximum priority value. In addition, the data loss associated with the Maxing approach should be insubstantial, assuming that the constituent responses of the group (e.g., R1 and R2 in Table IV) are similar. For example, it should be rare that a participant would assign vastly different priority values to similar responses (e.g., one star to a first response and five stars to a similar second response). To the contrary, it is much more likely that a participant would assign the same or close to the same priority values to similar responses. Accordingly, the data loss associated with the Maxing approach when calculating respective sub-total values (e.g., the bottom cell in each of the P1 and P2 columns in Table IV) should be insubstantial in some embodiments.

In some embodiments, a "Frequency-Based Revision" method is executed, e.g., by the server device system 202 (with or without user input, e.g., from an originator device 204) at step 336 to revise each of at least some of the group priority values (e.g., calculated by the Summing or Maxing approach, discussed above) to account for a number of times that the constituent responses in the respective group were viewed or prioritized by participants. In some embodiments, the Frequency-Based Revision method generates a respective revised group priority value in a manner that expresses an inverse relationship between the respective group priority and the number of times the constituent responses in the respective group were viewed or prioritized. For example, in some embodiments, the respective revised group priority is the group priority value divided by the number of times the constituent responses in the respective group were viewed (but not necessarily prioritized in this example). For instance, assume a group G1 of responses R1-R3 with the characteristics shown in Table V, below.

TABLE V

| Response | "Summing" Method Priority Sub-Total From All Participants | # Times Viewed |
| --- | --- | --- |
| R1 | 12 Stars | 3 |
| R2 | 15 Stars | 4 |
| R3 | 13 Stars | 3 |
| | Group Priority Value = 40 Stars | Total Times Viewed = 10 |

In the example of Table V, the response R1 was viewed three times by participants, and among those three viewings, the response R1 received a total of 12 stars. (Although the Summing method is used in this example, the Maxing method or some other method may be used.) The same analysis applies to responses R2 and R3. In some embodiments, the Frequency-Based Revision method revises the Group Priority Value of 40 stars by dividing it by the total number of times the constituent responses R1-R3 in the respective group G1 were viewed (i.e., 10 times) to generate a "revised group priority value" of 4.

It should also be noted that a group need not be assigned only one type of group priority value. For example, Table III, Table IV, and Table V illustrate respective total priority values for group G1, one based on the Summing method, one based on the Maxing method, and a revised one based on the Frequency-Based Revision method. One or more of these respective total priority values may be assigned to or associated with (e.g., in the memory device system 212) the respective group (e.g., G1). In addition to, or in lieu of, one or more of these total priority values, one or more other priority values may be assigned to the respective group. For example, the sub-total values, e.g., of Table III, Table IV, or both; an overall average priority value (e.g., the average of the asterisk-cells of Table II ((two-stars+one-star+three-stars+two-stars)/4=two stars)); one or more individual-participant average priority values (e.g., the average of the P1 column, the P2 column, or the respective averages of the P1 column and the P2 column in Table 1), or a combination of some or all of these or other values may be assigned to or associated with the respective group in the memory device system 212.

In some embodiments, the post-processing of step 336 may include the generation of results-based information summarizing the participant-evaluated-responses, their priorities, or associated group priorities for presentation to a manager, an administrator, some other decision-maker, or some other user via a data processing device or device system, such as an originator device 204. Results of the post-processing of step 336 may be stored in the processor-accessible memory device system 212 (or in the one or more databases 210 stored therein), or may be transmitted to another device for output, such as to an originator device 204 or another user's device for storage, display, or mechanism for review by a user with appropriate authority.

Subsets or combinations of various embodiments described above provide further embodiments. These and other changes can be made to the invention in light of the above-detailed description and still fall within the scope of the present invention. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. A computer-implemented method for evaluating inquiry-responses, the method comprising the steps of:
receiving a plurality of connections, via a network, from a plurality of network-connected participant devices, the plurality of participant devices operable to present, on an attached graphical user interface, one or more responses, of a plurality of quantitative responses, on one of a plurality of display-screen-pages;
receiving a connection, via the network, from at least one network-connected originator device;
receiving, from the at least one originator device, at least one inquiry;
transmitting the at least one inquiry, via the network, to at least a portion of the plurality of participant devices;
receiving the plurality of qualitative responses, via the network, the plurality of qualitative responses associated to the at least one inquiry, from at least a portion of the plurality of participant devices;

processing the plurality of qualitative responses to generate a plurality of processed responses;

creating a plurality of sets, each set comprising a different portion of the plurality of processed responses;

distributing a first set, over the network, to a first portion of participant devices of the plurality of participant devices for participant evaluation;

presenting the first set on at least one of a plurality of display-screen-pages to the first portion of participant devices;

distributing a second set, via the network, to a second portion of participant devices of the plurality of participant devices for participant evaluation;

presenting the first set on at least one of a plurality of display-screen-pages to the second portion of participant devices;

recording a participant-evaluated session for each participant device that received a processed response, the participant-evaluated session comprising an indication of a response for each processed response of the different portion of the plurality of processed responses associated to a set;

receiving a plurality of participant responses to processed responses, from at least a portion of the participant devices;

recording a number of times (a) each of the plurality of processed responses received a participant-evaluated response, or (b) each of the plurality of processed responses has been included in at least one set of the plurality of sets;

determining at least one less-distributed processed response, of the plurality of processed responses, the at least one less-distributed processed response associated with a fewer number of times of the recorded number of times each of the plurality of processed responses has been included in at least one set of the plurality of sets, than other processed responses of the plurality of processed responses;

including at least one of the less-distributed processed responses in at least one set of the plurality of sets;

distributing the at least one set comprising the at least one of the less-distributed processed responses, via the network, to at least a portion of participant devices;

presenting the at least one set comprising the at least one of the less-distributed processed responses on at least one of a plurality of display-screen-pages associated to the at least portion of participant devices;

wherein the distribution of the plurality of sets happens contemporaneously.

2. The method of claim 1, wherein the processing includes grouping the accessed plurality of qualitative responses to generate each of the plurality of processed responses as a different group.

3. The method of claim 2, wherein the processing includes combining at least two duplicate ones of the accessed plurality of qualitative responses into one of the plurality of processed responses as a single group.

4. The method of claim 1, wherein post-processing includes forming groups of the participant-evaluated responses.

5. The method of claim 4, wherein each respective participant-evaluated response of the participant-evaluated responses includes a priority value, wherein the post-processing includes forming at least a first group of the groups based on a first subset of the participant-evaluated responses, wherein the post-processing includes determining at least a group priority value associated with at least the first group based at least on an analysis of the priority values associated with the first subset of the participant-evaluated responses, and wherein the post-processing includes associating, in the processor-accessible memory device system, at least the determined group priority value with at least the first group.

6. The method of claim 5, wherein the determining of the group priority value associated with the first group includes determining the group priority value associated with the first group based at least on an analysis of the priority values associated with the first subset of the participant-evaluated responses and a number of times responses in the first subset of the participant-evaluated responses have been viewed by a participant.

7. The method of claim 5, wherein the post-processing includes determining the group priority value based at least on summing the priority values associated with the first subset of the participant-evaluated responses.

8. The method of claim 5, wherein the post-processing includes determining the group priority value at least by selecting a maximum priority value of a plurality of the priority values associated with the first subset of the participant-evaluated responses, the plurality of the priority values having been assigned by a particular participant performing at least part of the participant evaluation.

9. The method of claim 5, wherein the post-processing includes determining the group priority value at least by selecting a plurality of maximum priority values from at least some of the priority values associated with the first subset of the participant-evaluated responses, each of the maximum priority values representing a maximum priority value assigned by a respective participant performing at least part of the participant evaluation among responses in the first subset of the participant-evaluated responses.

10. The method of claim 9, wherein the post-processing includes determining the group priority value at least by summing the plurality of maximum priority values.

11. The method of claim 4, wherein the post-processing includes grouping at least highest priority ones of the participant-evaluated responses.

12. The method of claim 11, wherein the processing does not include grouping the qualitative responses.

13. The method of claim 11, wherein each of the processed responses corresponds to a different one of the accessed plurality of qualitative responses.

14. The method of claim 1, wherein the participant evaluation includes a participant prioritization of at least some of the plurality of processed responses.

15. The method of claim 2, wherein each respective page of the multiple pages is associated with a respective theme where only those processed responses associated with the respective theme are displayed on the respective page, and wherein at least some of the multiple pages are associated with a different theme than others of the multiple pages.

16. The method of claim 1, wherein each of the multiple pages displays a user-customizable number of the processed responses for evaluation.

17. The method of claim 14, wherein the participant prioritization is a first participant prioritization, and wherein the participant evaluation includes a second participant prioritization after the first participant prioritization, the second participant prioritization being a participant prioritization of a highest priority subset of the at least some of the plurality of processed responses that were prioritized highest in the first participant prioritization.

18. The method of claim 15, further comprising the step of generating at least some of the themes based at least on participant-input keywords.

19. The method of claim 13, further comprising the step of receiving, after the distributing, participant indications of duplicate processed responses, wherein the post-processing accounts for the participant indications of duplicate processed responses.

20. The method of claim 19, wherein the distributing step includes distributing respective subsets of the plurality of processed responses over the network to one or more of the plurality of participant devices for the participant evaluation by respective participants.

21. The method of claim 20, wherein each respective subset of the respective subsets of the plurality of processed responses includes at least one processed response of the plurality of processed responses originating from the respective participant.

22. The method of claim 20, wherein at least one of the respective subsets of the plurality of processed responses includes all processed responses of the plurality of processed responses originating from the respective participant.

23. The method of claim 20, wherein each respective subset of the respective subsets of the plurality of processed responses includes all processed responses of the plurality of processed responses originating from the respective participant.

24. The method of claim 20, wherein each respective subset of the respective subsets of the plurality of processed responses includes processed responses of the plurality of processed responses originating from a diverse group of participants.

25. The method of claim 20, wherein each respective subset of the respective subsets of the plurality of processed responses includes processed responses of the plurality of processed responses originating from a group of participants that respectively exhibit a similar characteristic with the respective participant.

26. The method of claim 19, further comprising generating at least some of the respective subsets to include processed responses that cause the numbers of times to become more even.

27. The method of claim 19, further comprising the step of recording, in the processor-accessible memory device system, a number of times each of at least some of the plurality of processed responses has been participant-evaluated.

28. The method of claim 1, wherein the participant evaluation includes at least two of the multiple-display-screen-pages displaying a same one of the processed responses at a same one of the participant devices.

29. The method of claim 1, wherein the distributing step includes distributing a first set of the plurality of processed responses over the network to at least one of the plurality of participant devices for the participant evaluation on the display-screen-page-by-display-screen-page basis with each of the at least some of the first set of the plurality of processed responses presented on at least one of a plurality of display-screen-pages, and with each of the plurality of display-screen-pages displaying a different subset of the at least some of the first set of the plurality of processed responses.

30. The method of claim 29, wherein the first set of the plurality of processed responses is a subset of the plurality of processed responses.

31. An inquiry-response evaluation system comprising:
an inquiry-response evaluation computer comprising at least one memory, at least one processor, and a plurality of programming instructions, the plurality of programming instructions when executed by the at least one processor causes the at least one processor to:
receive, via a network, a plurality of connections from a plurality of network-connected participant devices, the plurality of participant devices operable to present, on an attached graphical user interface, one or more responses, of a plurality of quantitative responses, on one of a plurality of display-screen-pages;
receive, via the network, a connection from at least one network-connected originator device;
receive, from the at least one originator device, at least one inquiry;
transmit, via the network, the at least one inquiry to at least a portion of the plurality of participant devices;
receive a plurality of qualitative responses associated to the at least one inquiry from at least a portion of the plurality of participant devices;
process the plurality of qualitative responses to generate a plurality of processed responses;
create a plurality of sets, each set comprising a different portion of the plurality of processed responses;
distribute a first set over a network to a first portion of participant devices of the plurality of participant devices for participant evaluation;
present the first set on at least one of a plurality of display-screen-pages to the first portion of participant devices;
distribute a second set, over the network, to a second portion of participant devices of the plurality of participant devices for participant evaluation;
present the second set on at least one of a plurality of display-screen-pages to the second portion of participant devices;
record a participant-evaluated session for each participant device that received a processed response, the participant-evaluated session comprising an indication of a response for each processed response of the different portion of the plurality of processed responses associated to a set;
receive a plurality of participant responses to processed responses, from at least a portion of the participant devices;
record a number of times (a) each of the plurality of processed responses received a participant-evaluated response, or (b) each of the plurality of processed responses has been included in at least one set of the plurality of sets;
determine at least one less-distributed processed response, of the plurality of processed responses, the at least one less-distributed processed response associated with a fewer number of times of the recorded number of times each of the plurality of processed responses has been included in at least one set of the plurality of sets, than other processed responses of the plurality of processed responses;
include at least one of the less-distributed processed responses in at least one set of the plurality of sets;
distribute the at least one set comprising the at least one of the less-distributed processed responses, via the network, to at least a portion of participant devices;

present the at least one set comprising the at least one of the less-distributed processed responses on at least one of a plurality of display-screen-pages associated to the at least portion of participant devices;

wherein the distribution of the plurality of sets happens contemporaneously.

32. The system of claim 31, wherein the plurality of sets collectively comprises all processed responses of the plurality of processed responses.

33. The system of claim 31, wherein each processed response of the plurality of processed responses has been distributed or participant-evaluated a number of times based on a preconfigured threshold.

34. The system of claim 31, wherein the distributing step includes distributing respective subsets of the plurality of processed responses over the network to one or more of the plurality of participant devices for the participant evaluation.

35. The system of claim 34, wherein each respective subset of the respective subsets of the plurality of processed responses includes at least one processed response of the plurality of processed responses originating from the respective participant device.

36. The system of claim 34, wherein at least one of the respective subsets of the plurality of processed responses includes all processed responses of the plurality of processed responses originating from the respective participant device.

37. The system of claim 34, wherein each respective subset of the respective subsets of the plurality of processed responses includes all processed responses of the plurality of processed responses originating from the respective participant device.

* * * * *